United States Patent
Nishikawa et al.

(10) Patent No.: US 11,364,567 B2
(45) Date of Patent: Jun. 21, 2022

(54) LASER MACHINING APPARATUS THAT IRRADIATES GUIDE BEAM TO PROJECT GUIDE PATTERN INDICATING SETUP POSITION FOR WORKPIECE

(71) Applicant: BROTHER KOGYO KABUSHIKI KAISHA, Nagoya (JP)

(72) Inventors: Yasuo Nishikawa, Nagoya (JP); Koki Furukawa, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 207 days.

(21) Appl. No.: 16/016,114

(22) Filed: Jun. 22, 2018

(65) Prior Publication Data
US 2018/0297147 A1    Oct. 18, 2018

Related U.S. Application Data

(63) Continuation of application No. PCT/JP2016/087897, filed on Dec. 20, 2016.

(30) Foreign Application Priority Data

Dec. 24, 2015  (JP) ............................. JP2015-251987

(51) Int. Cl.
*B23K 26/00* (2014.01)
*B23K 26/082* (2014.01)
(Continued)

(52) U.S. Cl.
CPC ............ *B23K 26/082* (2015.10); *B23K 26/03* (2013.01); *B23K 26/032* (2013.01);
(Continued)

(58) Field of Classification Search
CPC .... B23K 26/03; B23K 26/032; B23K 26/082; B23K 26/364; B23K 26/703; G02B 26/105
(Continued)

(56) References Cited

U.S. PATENT DOCUMENTS 6,066,829 A *  5/2000  Ishikawa ................ B23K 26/02
                                                    219/121.68
2008/0191390 A1*  8/2008  Fukushima .......... B23K 26/146
                                                    264/400

(Continued)

FOREIGN PATENT DOCUMENTS

JP        H1058167 A      3/1998
JP       2003117669 A     4/2003
(Continued)

OTHER PUBLICATIONS

International Search Report and Written Opinion issued in connection with International Patent Application No. PCT/JP2016/085716, dated Jan. 10, 2017. (5 pages).

(Continued)

*Primary Examiner* — Sang Y Paik
(74) *Attorney, Agent, or Firm* — K&L Gates LLP

(57) ABSTRACT

A laser machining apparatus includes: a laser beam emission device; a guide beam emission device; a scanner; a processor; and a memory. The memory stores a set of computer-readable instructions therein. The set of computer-readable instructions, when executed by the processor, causes the laser machining apparatus to perform: acquiring workpiece contour information specifying a contour of the workpiece; extracting a plurality of feature points from the workpiece contour information, each of the plurality of feature points being on the contour of the workpiece; generating a guide pattern indicating a setup position of the workpiece according to the plurality of feature points; and drawing the guide pattern with the guide beam by controlling the guide beam emission device and the scanner.

14 Claims, 13 Drawing Sheets

(51) Int. Cl.
  *B23K 26/70* (2014.01)
  *B23K 26/03* (2006.01)
  *B23K 26/364* (2014.01)
  *G02B 26/10* (2006.01)

(52) U.S. Cl.
  CPC .......... *B23K 26/364* (2015.10); *B23K 26/703* (2015.10); *G02B 26/105* (2013.01)

(58) Field of Classification Search
  USPC .......................................... 219/121.6–121.86
  See application file for complete search history.

(56) References Cited

U.S. PATENT DOCUMENTS

| | | | | |
|---|---|---|---|---|
| 2011/0304836 | A1* | 12/2011 | Tanioka | G02B 27/0031 355/67 |
| 2014/0116998 | A1* | 5/2014 | Chen | B23K 26/02 219/121.78 |
| 2017/0015046 | A1* | 1/2017 | Lim | B23K 26/032 |

FOREIGN PATENT DOCUMENTS

| | | | |
|---|---|---|---|
| JP | 2004114112 | A | 4/2004 |
| JP | 2005-262311 | * | 9/2005 |
| JP | 2007-118051 | A | 5/2007 |
| JP | 2009107002 | A | 5/2009 |
| JP | 2009-208132 | A | 9/2009 |
| JP | 2011-212727 | A | 10/2011 |
| JP | 2012-076147 | A | 4/2012 |
| JP | 2013-240834 | A | 12/2013 |

OTHER PUBLICATIONS

International Preliminary Report on Patentability issued in connection with counterpart International Application No. PCT/JP2016/087897, dated Jul. 5, 2018. (8 pages).

International Search Report and Written Opinion issued in connection with International Patent Application No. PCT/JP2016/087897, dated Feb. 7, 2017. (13 pages).

* cited by examiner

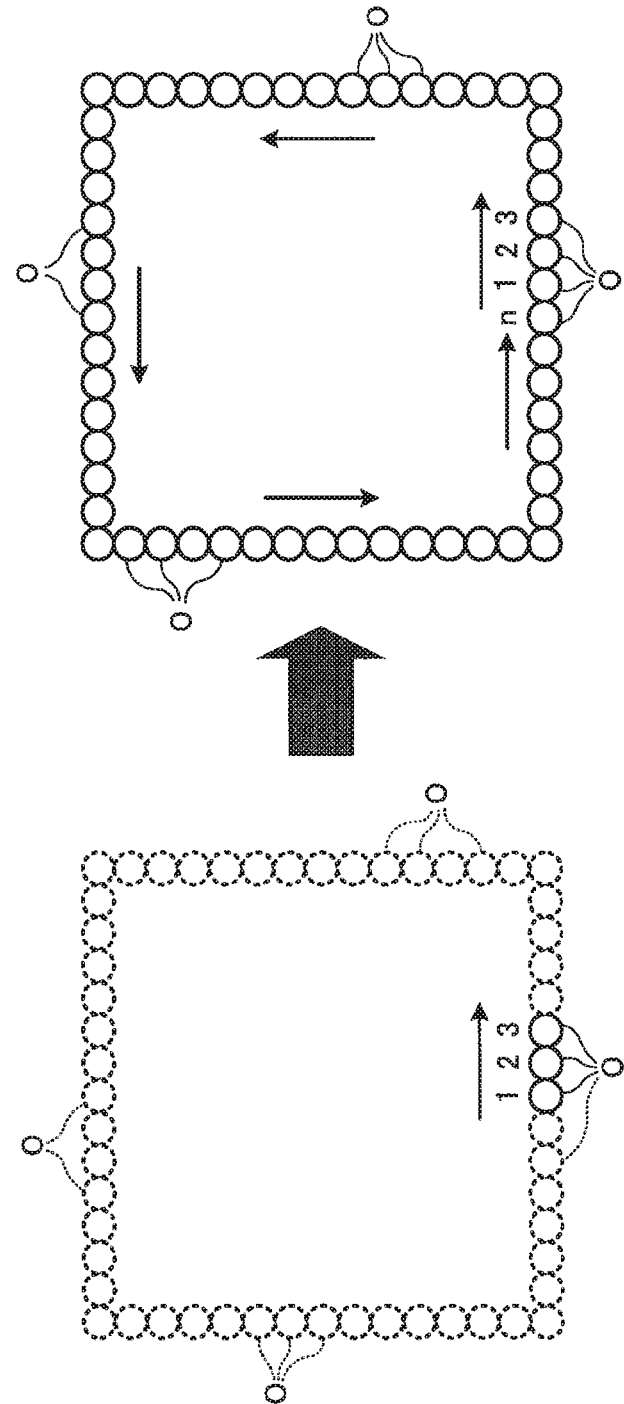

LASER MACHINING APPARATUS THAT IRRADIATES GUIDE BEAM TO PROJECT GUIDE PATTERN INDICATING SETUP POSITION FOR WORKPIECE

CROSS REFERENCE TO RELATED APPLICATION

This application is a bypass continuation application of International Application No. PCT/JP2016/087897 filed Dec. 20, 2016 in the Japan Patent Office acting as Receiving Office, claiming priority from Japanese Patent Application No. 2015-251987 filed Dec. 24, 2015. The entire contents of each of these applications are incorporated herein by reference.

TECHNICAL FIELD

The present disclosure relates to a laser machining apparatus for machining the surface of a workpiece by irradiating a laser beam thereon.

BACKGROUND

A conventional laser machining apparatus is provided with a laser emission device, a scanner that scans the laser beam emitted from the laser emission device, a processor, and a memory. The laser machining apparatus scans the laser beam with the scanner to perform laser beam machining of a workpiece.

In order to machine a workpiece at a desired position using this type of laser machining apparatus, it is important to adjust the position of the workpiece. For this purpose, the laser machining apparatus is provided with a guide beam emission device. The guide beam emission device irradiates a visible laser beam functioning as a guide beam. The laser machining apparatus scans the guide beam so that the beam projects machining content onto the workpiece.

One such laser machining apparatus known in the art is a laser marking apparatus provided with a visible laser light source that irradiates a visible laser beam used as a guide, a galvano scanner (corresponding to the scanner) that redirects the visible laser beam to irradiate the visible laser beam onto a printing target (corresponding to the workpiece), and controlling means for driving and controlling the galvano scanner to scan the visible laser beam so that an image corresponding to printing content to be printed, such as characters, symbols, and graphics, is projected onto the printing target (see Japanese Patent Application Publication No. 2003-417660).

This conventional laser marking apparatus is also provided with control data generating means that generates data for controlling the galvano scanner. The control data generating means is configured to generate control data for scanning the visible laser beam in order to project an image for simplified printing content in which at least some of the characters, symbols, graphics, and the like in the printing content are replaced with simplified characters, symbols, or graphics. With this configuration, the conventional laser marking apparatus enables a user to adjust the relative positions of the projected image (printing content) and the printing target while referring to the image projected by the visible laser beam in order that the printing content corresponding to the projected image can be reliably printed at the desired position on the printing target.

SUMMARY

While it is essential to adjust the position of the workpiece in order to machine a desired position on the workpiece as described above, the user adjusts the position of the workpiece while visually referencing the image projected on the workpiece by the visible laser beam and, hence, is subjectively determining the positional balance of the projected image on the workpiece when performing these positional adjustments. It is unlikely that the user can adjust the position of the workpiece with high precision using this method. Moreover, if the printing content were to change, the position of the projected image would also likely change, forcing the user to repeat the process of adjusting the position of the workpiece with the conventional configuration described above.

In recent years, sonic of the workpieces marked by laser machining apparatuses include such members as light switch covers and outlet panels that are formed in complex shapes. When the surface profiles of the workpieces are this diverse, positional adjustment of the workpiece must be even more precise. It is particularly difficult to adjust the position of the workpiece precisely when the printing region is isolated from any external features that can be used as a guide. In some cases, the desired region on the surface of the workpiece in which machining is to be performed is small. For example, there are cases in Which machining must fit within a prescribed region several millimeters square on a workpiece that is several centimeters square. In such cases, the position of the workpiece must be adjusted with great precision. The conventional apparatus described above cannot sufficiently achieve the precision in positional adjustments required in these cases and, therefore, is not always able to machine the desired position on the workpiece properly.

In view of the foregoing, it is an object of the present disclosure to provide a laser machining apparatus having a laser beam emission device, a guide beam emission device, a scanner, a processor, and a memory for machining a workpiece by irradiating a laser beam thereon, and that irradiates a guide beam to project a guide pattern capable of contributing to precise positional adjustments of the workpiece.

In order to attain the above and other objects, the present disclosure provides a laser machining apparatus that includes: a laser beam emission device; a guide beam emission device; a scanner; a processor; and a memory. The laser beam emission device is configured to emit a laser beam for machining a workpiece. The guide beam emission device is configured to emit a visible laser beam as a guide beam. The scanner is configured to scan the laser beam emitted from the laser beam emission device and the guide beam emitted from the guide beam emission device. The memory stores a set of computer-readable instructions therein. The set of computer-readable instructions, when executed by the processor, causes the laser machining apparatus to perform: acquiring workpiece contour information specifying a contour of the workpiece; extracting a plurality of feature points from the workpiece contour information, each of the plurality of feature points being on the contour of the workpiece; generating a guide pattern indicating a setup position of the workpiece according to the plurality of feature points; and drawing the guide pattern with the guide beam by controlling the guide beam emission device and the scanner.

BRIEF DESCRIPTION OF THE DRAWINGS

The particular features and advantages of the disclosure as well as other objects will become apparent from the following description taken in connection with the accompanying drawings, in which:

FIGS. 8A and 8B are explanatory diagrams concerning storage of workpiece contour information to a contour point storage area;

DETAILED DESCRIPTION

Figure 1:
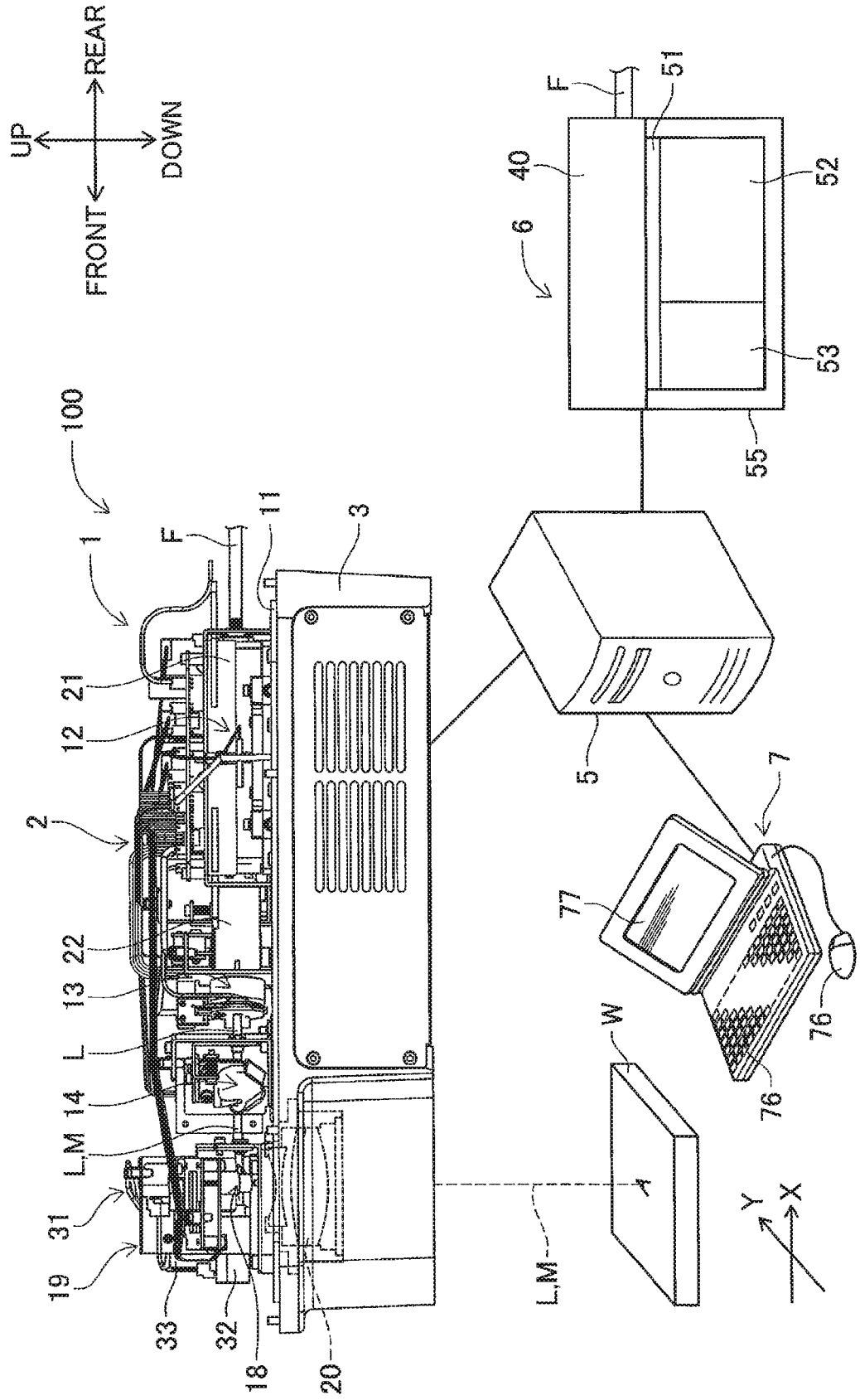
FIG. 1 is a schematic view of a laser machining apparatus according to one embodiment of the present disclosure.

An embodiment in which a laser machining apparatus according to the present disclosure is embodied as a laser machining apparatus 100 will be described while referring to the accompanying drawings wherein like parts and components are designated by the same reference numerals to avoid duplicating description.

(Schematic Configuration of Laser Machining Apparatus)

Firstly the schematic configuration of the laser machining apparatus 100 according to the present embodiment will be explained in detail with reference to the drawings. The laser machining apparatus 100 includes a laser machining unit 1 and a personal computer (PC) 7. The laser machining apparatus 100 is configured to control the laser machining unit 1 according to machining data generated by the PC 7, thereby performing marking machining in which a laser beam L scans the surface of a workpiece W two dimensionally.

(Schematic Configuration of Laser Machining Unit)

Next, the schematic configuration of the laser machining unit 1 of the laser machining apparatus 100 will be described in detail with reference to the drawings. As illustrated in FIG. 1, the laser machining unit 1 according to the present embodiment includes an apparatus main unit 2, a laser controller 5, and a power unit 6.

The apparatus main unit 2 irradiates the laser beam L onto the surface of the workpiece W and performs two-dimensional scan of the laser beam L on the surface of the workpiece W, thereby executing the marking machining on the surface of the workpiece W. The laser controller 5 is configured of a computer, and is connected to the PC 7 so as to be capable of performing bi-directional communications therebetween. The laser controller 5 is also electrically connected to the apparatus main unit 2 and power unit 6. The PC 7 is used for generating the drawing data, for inputting various instructions about the machining with the laser machining apparatus 100, and the like. The laser controller 5 drives and controls the apparatus main unit 2 and power unit 6 on the basis of the drawing data, control parameters, and various instructions transmitted from the PC 7.

Note that FIG. 1 illustrates only the schematic configuration of the laser machining apparatus 100 and laser machining unit 1, thus the apparatus main unit 2 is also schematically illustrated in FIG. 1. Therefore, the specific configuration of the apparatus main unit 2 will be described later.

(Schematic Configuration of Apparatus Main Unit)

Next, the schematic configuration of the apparatus main unit 2 will be described with reference to FIGS. 1 and 2. In the description about the apparatus main unit 2, the leftward, rightward, upward, and downward in FIG. 1 respectively correspond to frontward, rearward, upward, and downward of the apparatus main unit 2 as indicated in FIG. 1. Thus, an emitting direction of the laser beam L from a laser oscillation unit 12 (described later) is the frontward direction. Also, the direction perpendicular to both a main base 11 (described later) and the emitting direction of the laser beam L is the upward/downward directions. Further, the direction perpendicular to both the upward/downward directions and the frontward/rearward directions is the leftward/rightward directions of the apparatus main unit 2.

The apparatus main unit 2 includes a laser head unit 3 (see FIGS. 1 and 2) coaxially emitting the laser beam L and a guide beam M from an fθ lens 20, and a substantially box-shaped machining chamber (not illustrated) having an upper surface on which the laser head unit 3 is fixed.

Figure 2:
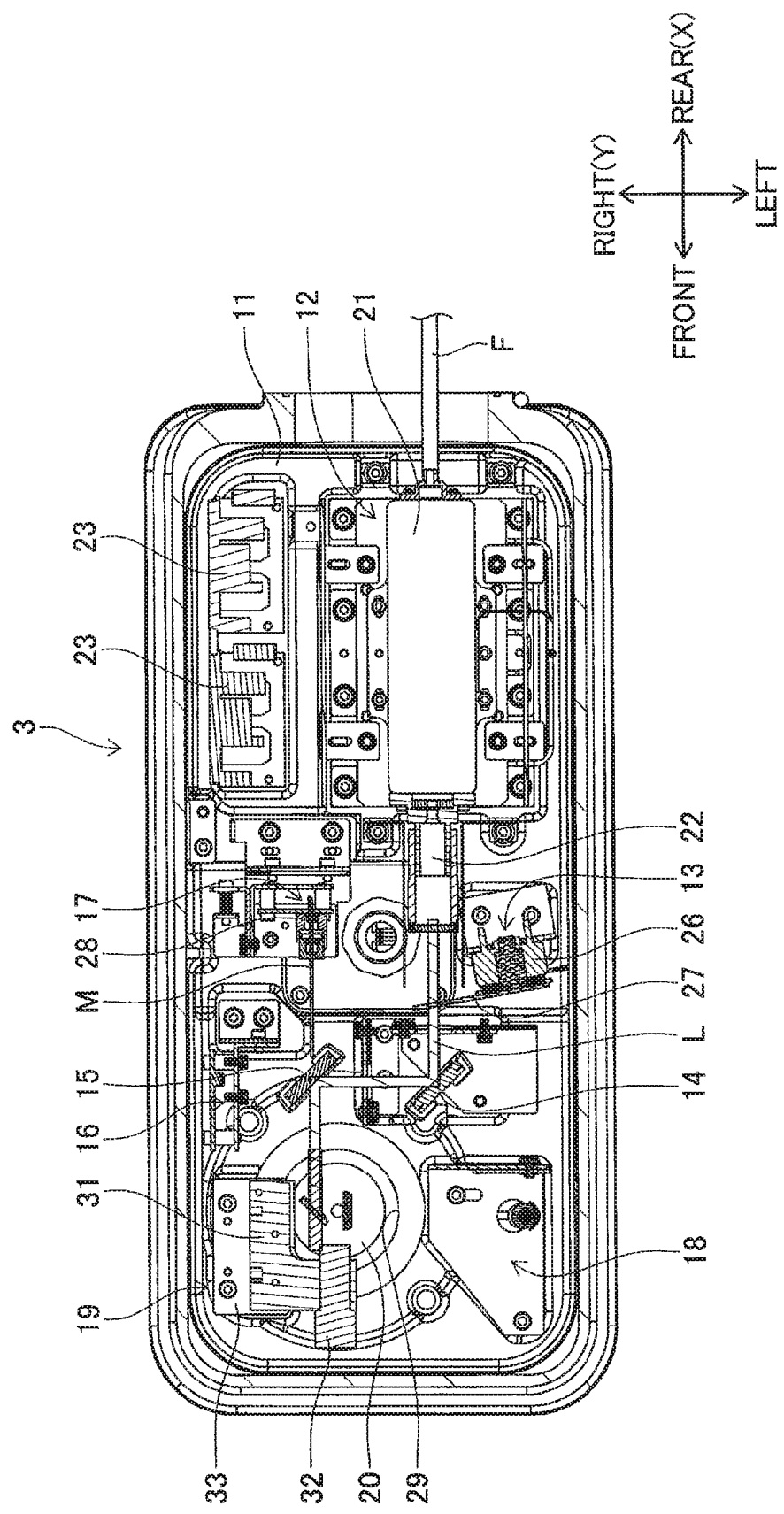
FIG. 2 is a plan view illustrating a structure of a laser head unit in the laser machining apparatus according to the embodiment.

As illustrated in FIGS. 1 and 2, the laser head unit 3 includes the main base 11, the laser oscillation unit 12 configured to emit the laser beam L, a light shutter unit 13, a reflection mirror 14, a half mirror 15, an optical sensor 16, a guide beam unit 17, a pointer beam emission unit 18, a galvano scanner 19, and the fθ lens 20. The laser head unit 3 is housed in a substantially cuboid-shaped housing (not illustrated).

The laser oscillation unit 12 includes a laser oscillator 21 and a beam expander 22, and is mounted on the main base 11 with a mounting base and screws. The laser oscillator 21 has a fiber connector, a condenser lens, a reflection mirror, a laser medium, a passive Q-switch, an output coupler, and a window, which are accommodated in a casing. The power unit 6 has a semiconductor laser pumping unit 40. The fiber connector is in optical communication with an optical fiber F. Pump light emitted from the semiconductor laser pumping unit 30 is incident on the fiber connector via the optical fiber F.

The condenser lens concentrates the pump light incident from the fiber connector. The reflection mirror allows the pump light concentrated by the condenser lens to pass therethrough and simultaneously reflects a laser beam emitted from the laser medium at thigh efficiency. The laser medium is pumped by the pump light emitted from the semiconductor laser pumping unit 40 to oscillate the laser beam L. For example, neodymium doped yttrium aluminum garnet (Nd:YAG) crystal to which neodymium (Nd) is doped as a laser active ion, neodymium doped gadolinium vanadate (Nd:GdVO4) crystal to which neodymium (Nd) is doped as the laser active ion may be used as the laser medium.

The passive Q-switch functions as a Q-switch for oscillating the laser beam oscillated from the laser medium as a pulsed laser L having a pulse shape. For example, chrome doped YAG (Cr:YAG) crystal may be used as the passive Q-switch.

The output coupler constitutes the reflection mirror and a laser resonator. The output coupler is, for example, a partial reflection mirror configured of a concave mirror having a surface coated with a dielectric layer film. The partial reflection mirror has a reflection rate from 80% to 95% in a wavelength of 1064 nm. The window is formed of synthetic silica and the like formed of a dielectric multilayer film and the like, and allows the laser beam L emitted from the output coupler to pass therethrough outwardly. Thus, the laser oscillator 21 oscillates the pulsed laser through the passive Q-switch, and outputs the pulsed laser as the laser beam L for machining the workpiece W.

The beam expander 22 is disposed coaxially with the laser oscillator 21 and functions to modify the beam diameter of the laser beam L. The mounting base is fixed to the top surface of the main base 11 near the left rear corner thereof. The laser oscillation unit 12 is mounted on the mounting base with screws and is capable of adjusting the optical axis of the laser beam L.

As illustrated in FIGS. 1 and 2, the light shutter unit 13 includes a shutter motor 26 and a shutter 27. The shutter motor 26 is configured of a stepping motor or a rotary solenoid, for example. The shutter 27 has a plate shape. The shutter motor 27 is attached to a motor shaft of the shutter motor 26 and rotates together with the same. When the shutter 27 moves to a prescribed position in the optical path of the laser beam L as the shutter motor 26 is rotated, the shutter 27 blocks the laser beam L emitted from the laser oscillation unit 12. When the shutter 27 is rotated to a position not in the optical path of the laser beam L, the laser beam L is incident on the reflection mirror 14 positioned forward of the laser oscillation unit 12 and light shutter unit 13.

The reflection mirror 14 is oriented such that its reflective surface forms an angle of approximately forty-five degrees with the optical path of the laser beam L emitted from the laser oscillation unit 12. The laser beam L incident on the reflective surface of the reflection mirror 14 is reflected toward the half mirror 15 disposed on the right side of the reflection mirror 14.

The half mirror 15 is oriented such that its reflective surface forms an angle of approximately forty-five degrees with the optical path of the laser beam L reflected by the reflection mirror 14. The majority of the laser beam L incident on the reflective surface of the half mirror 15 is reflected toward the galvano scanner 19. However, a portion of the laser beam L incident on the reflective surface of the half mirror 15 is transmitted through the half mirror 15 to the optical sensor 16 positioned on the right side of the half mirror 15. In addition, the guide beam unit 17 disposed on the rear side of the half mirror 15 irradiates a guide beam M that is incident on the rear surface of the half mirror 15 (the surface on the opposite side of the reflective surface). The guide beam M incident on the rear surface of the half mirror 15 is transmitted through the half mirror 15 along the same optical path as the laser beam L reflected off the reflective surface of the half mirror 15.

The optical sensor 16 is configured of a photodiode and the like. The portion of the laser beam L transmitted through the half mirror 15 is incident on the optical sensor 16.

Through the optical sensor 16, the laser machining apparatus 100 can detect the intensity of the laser beam L outputted from the laser oscillator 21.

The guide beam unit 17 is configured of a visible semiconductor laser 28, and a lens array (not illustrated). The visible semiconductor laser 28 irradiates the guide beam M, such as a red laser beam, and the lens array collimates the guide beam M emitted from the visible semiconductor laser 28 into a parallel beam. The guide beam. M has a different wavelength from that of the laser beam L irradiated from the laser oscillator 21. The guide beam unit 17 is disposed on the rear side of the half mirror 15 and is fixed to the main base 11 in an orientation that aligns the optical path of the guide beam M transmitted through the half mirror 15 with the optical path of the laser beam. L travelling from the half mirror 15 toward the galvano scanner 19.

The pointer beam emission unit 18 is disposed on the main base 11 in the left front corner thereof. The pointer beam emission unit 18 is capable of emitting a visible light pointer beam toward the interior of a machining chamber without the beam passing through the fθ lens 20. The pointer beam emission unit 18 irradiates the pointer beam so that the beam forms a prescribed angle of incidence on a workpiece support part (not illustrated) disposed inside the machining chamber. The pointer beam intersects the guide beam M at the focal point of the laser beam L converged by the fθ lens 20. With the laser machining apparatus 100 having this configuration, the user can discern the focal plane passing through the focal point of the laser beam L by referencing the point of intersection between the guide beam M emitted from the guide beam unit 17 and the pointer beam emitted from the pointer beam emission unit 18. Accordingly, the user can appropriately adjust the position of the workpiece W in the upward/rearward direction of the workpiece W so that the surface of the workpiece W to be machined is aligned with the focal plane of the laser beam L.

The galvano scanner 19 is mounted above a through-hole 29 formed in the front portion of the main base 11. The galvano scanner 19 directs the laser beam L emitted from the laser oscillation unit 12 and the guide beam M reflected off the half mirror 15 downward through the through-hole 29 and performs two-dimensional scan. The galvano scanner 19 is configured of a galvano X-axis motor 31 having a galvano X-axis mirror, a galvano Y-axis motor 32 having a galvano Y-axis mirror, and a main unit 33. The galvano X-axis motor 31 and galvano Y-axis motor 32 are mounted and retained in the main unit 33 by being fitted into respective mounting holes from the outside thereof, so that the motor shafts of the galvano X-axis motor 31 and galvano Y-axis motor 32 are orthogonal to each other.

The galvano X-axis mirror is mounted on the distal end of the motor shaft in the galvano X-axis motor 31 as a scanning mirror. The galvano X-axis mirror is used for scanning the laser beam L and guide beam M in an X-direction on the surface of the workpiece W. The galvano Y-axis mirror is mounted on the distal end of the motor shaft in the galvano Y-axis motor 32 as a scanning mirror. The galvano Y-axis mirror is used for scanning the laser beam L and guide beam M in a Y-direction on the surface of the workpiece W.

Hence, the inside surfaces of the scanning mirrors mounted on the distal ends of the motor shafts in the corresponding galvano X-axis motor 31 and galvano Y-axis motor 32 oppose each other in the galvano scanner 19. Controlling the rotations of the galvano X-axis motor 31 and galvano Y-axis motor 32 changes the positions of the respective scanning mirrors (i.e., the galvano X-axis mirror and galvano Y-axis mirror). As a result, the laser beam L and guide beam M are directed downward and perform two-dimensional scans for scanning the laser beam L and guide beam M in the frontward/rearward direction (X-direction) and in the leftward/rightward direction (Y-direction).

The fθ lens 20 is mounted on the main base 11 of the laser head unit 3, and operates to coaxially collimate the two-dimensionally scanning laser beam L and guide beam M onto the surface of the workpiece W disposed below the fθ lens 20. The fθ lens 20 converges the laser beam L and guide beam M into a focal point that is a planate focal plane, and adjusts the laser beam L and guide beam M so as to regulate the constant scanning speed of the laser beam L and guide beam M. In this manner, with the laser machining apparatus 100 having this configuration, by controlling the rotations of the galvano X-axis motor 31 and galvano Y-axis motor 32, the laser beam L and guide beam M perform two-dimensional scan in both the frontward/rearward direction (X-direction) and the leftward/rightward direction (Y-direction) on the surface of the workpiece W, thereby forming a desired machining pattern on the workpiece W.

As illustrated in FIG. 2, a circuit board is arranged upright on the rear portion of the main base 11 and to the right side of the laser oscillation unit 12. Galvano drivers 23 are mounted on this circuit board. The galvano drivers 23 drive the X-axis galvano motor 31 and Y-axis galvano motor 32 on the basis of motor drive information inputted from a galvano controller 56 described later in order to scan the laser beam L and guide beam M two-dimensionally.

(Schematic Configuration of Power Unit)

Next, the schematic configuration of the power unit 6 in the laser machining apparatus 100 will be described with reference to FIG. 1. As illustrated in FIG. 1, the power unit 6 includes the semiconductor laser pumping unit 40, a laser driver 51, a power supply part 52, and a cooling unit 53, which are provided in a casing 55. The power supply part 52 supplies a drive current for driving the semiconductor laser pumping unit 40 to the semiconductor laser pumping unit 40 through the laser driver 51. The laser driver 51 drives the semiconductor laser pumping unit 40 ON and OFF by DC drive on the basis of laser driving data inputted from the laser controller 5.

The semiconductor laser pumping unit 40 is optically connected to the laser oscillator 21 through the optical fiber F, and is driven and controlled through the laser driver 51 to generate pump light. Thus, the pump light from the semiconductor laser pumping unit 40 is injected into the laser oscillator 21 via the optical fiber F.

The cooling unit 53 is provided for keeping the temperature of the semiconductor laser pumping unit 40 and power supply part 52 within a prescribed range. The cooling unit 53 controls temperature of the semiconductor laser pumping unit 40 by, for example, an electron cooling system to finely adjust an oscillation wavelength of the semiconductor laser pumping unit 40.

(Control System of Laser Machining Unit)

Figure 3:
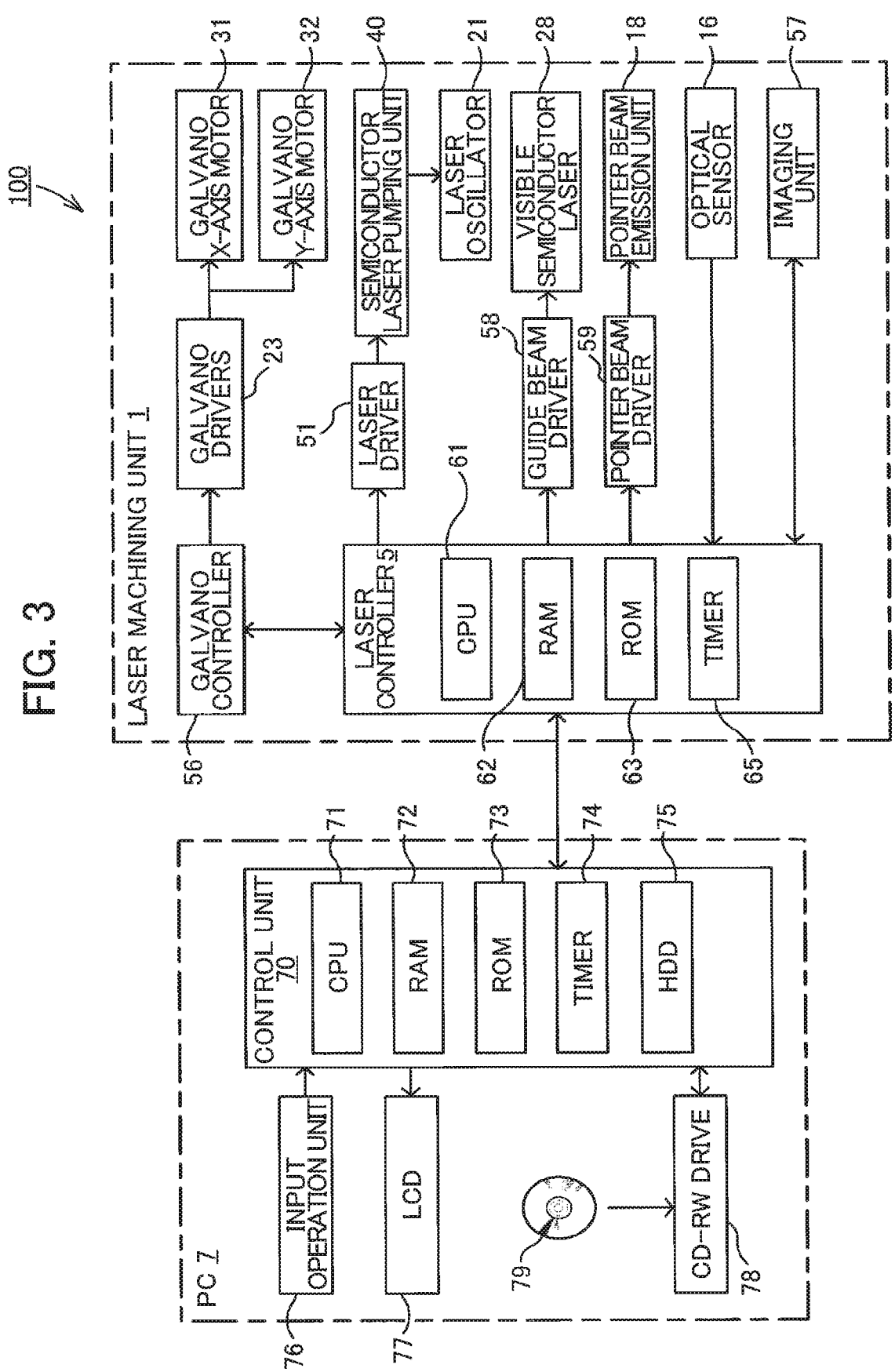
FIG. 3 is a block diagram illustrating a configuration of a control system in the laser machining apparatus according to the embodiment.

Next, the configuration of the control system of the laser machining unit 1 constituting the laser machining apparatus 100 will be described with reference to the drawings. As illustrated in FIG. 3, the laser machining unit 1 includes the laser controller 5 for governing overall operations of the laser machining unit 1, the laser driver 51, the galvano controller 56, the galvano drivers 23, a guide beam driver 58, a pointer beam driver 59, the optical sensor 16, an imaging unit 57, and the like. The laser controller 5 is in electrical communication with the laser driver 51, galvano controller 56, optical sensor 16, imaging unit 57, guide beam driver 58, pointer beam driver 59, and the like.

The laser controller 5 includes a central processing unit (CPU) 61, a random access memory (RAM) 62, a read-only memory (ROM) 63, a timer 65, and the like. The CPU 61 is provided as an arithmetic device and a control device for governing overall operations of the laser machining unit 1. The timer 64 is provided for measuring time.

The RAM 62 temporarily stores various results of arithmetic operations performed by the CPU 61, X- and Y-coordinate data of a machining and scanning pattern, and the like. The ROM 63 stores various programs including a program for performing arithmetic operations to obtain X- and Y-coordinate data of a machining and scanning pattern on the basis of machining data transmitted from the PC 7 to store the X- and Y-coordinate data in the RAM 62.

The CPU 61 executes various arithmetic and control processes using the control programs stored in the ROM 63. For example, the CPU 61 receives machining data from the PC 7 and sets laser driving data for the semiconductor laser pumping unit 40 such as output light intensity of pump light outputted from the semiconductor laser pumping unit 40, a time duration of outputting the pump light from the semiconductor laser pumping unit 40, and the like on the basis of the machining data. The CPU 61 outputs the laser driving data for the semiconductor laser pumping unit 40 to the laser driver 51. Also, the CPU 61 outputs X- and Y-coordinate data of each machining point configured of the machining data inputted from the PC 7, a control signal for instructing ON/OFF of the galvano scanner 19, galvano scanning speed data, and the like to the galvano controller 56.

The laser driver 51 drives and controls the semiconductor laser pumping unit 40 on the basis of the laser driving data such as the output light intensity of pump light outputted from the semiconductor laser pumping unit 40, the time duration of outputting the pump light from the semiconductor laser pumping unit 40, and the like inputted from the laser controller 5. Specifically, the laser driver 51 generates a pulse-shaped drive current having a current value proportional to the output light intensity of the pump light indicated by the laser driving data inputted from the laser controller 5, and outputs the pulse-shaped drive current to the semiconductor laser pumping unit 40 for an output time duration in accordance with the time duration of outputting the pump light indicated by the laser driving data. Thus, the semiconductor laser pumping unit 40 emits the pump light having intensity corresponding to the output light intensity of the pump light into the optical fiber F for the output time duration.

The galvano controller 56 computes driving angles and rotational speeds of both the galvano X-axis motor 31 and the galvano Y-axis motor 32 on the basis of the X- and Y-coordinate data, the galvano scanning speed data, and the like of each machining point configured of the machining data inputted from the laser controller 5. The galvano controller 56 outputs motor driving data representing the computed driving angle and rotational speed to the galvano drivers 23.

The galvano drivers 23 drive and control the galvano X-axis motor 31 and galvano Y-axis motor 32 on the basis of the motor driving data representing the driving angle and rotational speed and inputted from the galvano controller 56, thereby performing two-dimensional scan of the laser beam L.

The guide beam driver 58 controls the guide beam unit 17 including the visible semiconductor laser 28 on the basis of a control signal outputted from the laser controller 5. For example, the guide beam driver 58 controls the emission timing and intensity of the guide beam M irradiated from the visible semiconductor laser 28. The pointer beam driver 59 controls the pointer beam emission unit 18 on the basis of a control signal outputted from the laser controller 5 in order to control emission of the pointer beam.

The imaging unit 57 is configured of a digital camera or the like and captures an image of the workpiece W placed on the workpiece support part in the machining chamber. The imaging unit 57 captures an image of the workpiece W in response to a control signal (imaging command) inputted by the PC 7 via the laser controller 5 and outputs data for the captured digital image to the PC 7 via the laser controller 5. The imaging unit 57 is disposed in the upper portion of the machining chamber at a position obliquely above the workpiece W placed on the workpiece support part so as not to obstruct the optical path of the laser beam L and guide beam M passing through the fθ lens 20 or the optical path of the pointer beam irradiated by the pointer beam emission unit 18.

As illustrated in FIGS. 1 and 3, the laser controller 5 is connected to the PC 7, and the bi-directional communications can be made between the two. The laser controller 5 is configured to be able to receive machining data describing machining content, control parameters of the apparatus main unit 2, various user instructions, and the like from the PC 7.

(Control System of PC)

Next, the configuration of the control system of the PC 7 will be described with reference to the drawings. As illustrated in FIG. 3, the PC 7 is configured of a control unit 70 for governing overall operations of the PC 7, an input operation unit 76, a liquid crystal display (LCD) 77, a CD-RW drive 78, and the like. The input operation unit 70 is configured of a mouse, keyboard, and the like. The CD-RW drive 78 is provided for reading from and writing into CD-RW disc 79 various types of data, programs, and the like.

The control unit 70 includes a CPU 71, a RAM 72, a ROM 73, a timer 74, a hard disk drive (HDD) 75, and the like. The CPU 71 is provided as an arithmetic device and a control device for governing overall operations of the PC 7. The timer 74 is provided for measuring time. The RAM 72 temporarily stores various results of arithmetic operation performed by the CPU 71 and the like. The ROM 73 stores various control programs and data tables.

The HDD 75 is a storage device that stores various application programs and various data files. The HDD 75 also stores a program for a data creation process with which machining data describing machining content to be machined on the workpiece W with laser can be created.

More specifically, the HDD 75 stores various programs described later, including programs for a workpiece setup assistance process (see FIG. 4), a workpiece contour information acquisition process (see FIG. 5), a feature point extraction process (see FIG. 6), a bend point detection process (see FIG. 7), a guide pattern generation process (see FIG. 10), and a guide pattern editing process (see FIG. 13).

The CD-RW drive 78 reads application programs and data sets for various data tables and databases from the CD-RW disc 79 and writes data sets to the CD-RW disc 79. The CD-RW drive 78 can also read three-dimensional model data (3D model data) and the like from the CD-RW disc 79. The 3D model data describes the three-dimensional shapes of a workpiece W and is an example of the workpiece three-dimensional shape information specifying the external three-dimensional shape of the workpiece W.

Note that application programs such as the program for the data creation process, as well as the various data tables and databases, may be stored in the ROM 73 of the PC 7 or may be read from a storage medium such as the CD-RW disc 79. Alternatively, the user of the PC 7 may download this data from a server on the Internet or other network (not illustrated).

The input operation unit 76, LCD 77, and the like are electrically connected to the PC 7 via input/output interfaces (not illustrated). The input operation unit 76 is configured of a mouse, keyboard, and the like in the present embodiment.

(Workpiece Setup Assistance Process)

Next, steps in the workpiece setup assistance process executed by the CPU 71 of the PC 7 will be described with reference to FIG. 4. The CPU 71 executes this process as a preliminary step to the marking process performed on the workpiece W in order to assist the user in setting the workpiece W at a suitable position on the workpiece support part provided in the machining chamber. As described above, the CPU 71 reads the program for the workpiece setup assistance process from the HDD 75 of the PC 7 and executes the program.

In S1 at the beginning of the workpiece setup assistance process, the CPU 71 executes a workpiece contour information acquisition process. In this process, the CPU 71 receives input of workpiece shape information describing the external shape of the workpiece W targeted for marking and extracts workpiece contour information from this workpiece shape information. More specifically, in the workpiece contour information acquisition process of S1, the CPU 71 reads and executes the program for implementing the workpiece contour information acquisition process (see FIG. 5) stored on the HDD 75.

(Workpiece Contour Information Acquisition Process)

Here, the workpiece contour information acquisition process of S1 will be described with reference to FIG. 5. Upon launching the program for this process, in S11 of FIG. 5 the CPU 71 accepts input of workpiece shape information specifying the external shape of the workpiece W. Specifically, the CPU 71 receives workpiece shape information by reading 3D model data for the workpiece W stored on the CD-RW disc 79 through the CD-RW drive 78 or receives image data of the workpiece W captured by the imaging unit 57 in response to an imaging command issued through an operation by the user on the input operation unit 76. The CPU 71 stores the workpiece shape information in the RAM 72, and advances to S12.

In S12 the CPU 71 references the RAM 72 to determine whether the workpiece shape information is imaging data captured by the imaging unit 57. The CPU 71 advances to S13 when the workpiece shape information is imaging data (S12: YES) and advances to S15 when the workpiece shape information is not imaging data (S12: NO).

In S13 the CPU 71 performs a digital image process called keystone correction on the imaging data received as the workpiece shape information in S11. As described above, the imaging unit 57 according to the embodiment is disposed at a position obliquely above the workpiece W supported on the workpiece support part. However, the shape of the machining surface of the workpiece W can only be accurately imaged from a position directly above the workpiece W. In the keystone correction process of S13, the CPU 71 corrects the imaging data captured for the workpiece W from the oblique perspective to produce the shape of the workpiece W that would be captured from directly above the workpiece W. Often, the shape of the workpiece W in the imaging data is changed from a square to a trapezoidal shape when imaged from an oblique angle, but the shape is not always a simple trapezoid and must be determined on the basis of the relative positions and orientations of the workpiece W and imaging unit 57. When the workpiece W in the imaging data has a shape other than a trapezoid, a technique such as projection transformation may be used to correct the shape. In this specification, the term keystone correction is intended to include correction for non-trapezoidal shapes of the workpiece W in the imaging data. After completing this keystone correction, the CPU 71 advances to S14.

In S14 the CPU 71 executes a contour extraction process on the imaging data produced in the keystone correction process. Specifically, the CPU 71 first performs a thresholding process on the imaging data in the contour extraction process of S14 to convert each pixel of the image corresponding to the imaging data to binary values representing either white or black. Next, the CPU 71 performs an edge detection process or the like on the image represented by the binary imaging data to detect contour lines corresponding to the outline of the workpiece W on the basis of changes in density produced along the contours of the workpiece W in the image and stores the detected contours in the RAM 72 as workpiece contour information. The workpiece contour information includes a set of contour points O arranged in lines corresponding to the contours of the workpiece W and is configured of positional information (X- and Y-coordinate values) for each contour point O. After storing the workpiece contour information in the RAM 72, the CPU 71 ends the workpiece contour information acquisition process and advances to S2 in the workpiece setup assistance process (see FIG. 4).

When the workpiece shape information is not imaging data, in S15 the CPU 71 determines whether the workpiece shape information received in S11 is 3D model data related to the workpiece W by referencing the RAM 72. In the present embodiment, the CD-RW drive 78 is used to read 3D model data for the workpiece W from the CD-RW disc 79, for example. When the workpiece shape information is 3D model data (S15: YES), the CPU 71 advances to S16. However, if the workpiece shape information is not 3D model data (S15: NO), the CPU 71 ends the workpiece contour information acquisition process and advances to S2 in the workpiece setup assistance process (see FIG. 4).

In S16 the CPU 71 displays the three-dimensional shape of the workpiece W on the LCD 77 on the basis of the 3D model data for the workpiece W. The user operates the input operation unit 76 to indicate one of the surfaces (the top surface, bottom surface, one of the side surfaces, or the like) of the workpiece W to be the machining surface, and the CPU 71 receives this selection as the surface to undergo the marking process. The CPU 71 then advances to S17.

In S17 the CPU 71 generates projection data for the surface of the workpiece W selected in S16 on the basis of the 3D model data of the workpiece W. The projection data projects the external shape of the selected machining surface constituting the three-dimensional workpiece W onto a plane. The CPU 71 stores the projection data for the machining surface in the RAM 72. After storing the projection data in the RAM 72, the CPU 71 advances to S18.

In S18 the CPU 71 executes a contour extraction process on the projection data generated from the 3D model data. Specifically, in S18 the CPU 71 extracts contour lines corresponding to the outline of the workpiece W from the projection data and stores these contour lines in the RAM 72 as the workpiece contour information. After storing the workpiece contour information in the RAM 72, the CPU 71 ends the workpiece contour information acquisition process and advances to S2 in the workpiece setup assistance process (see FIG. 4).

Figure 4:
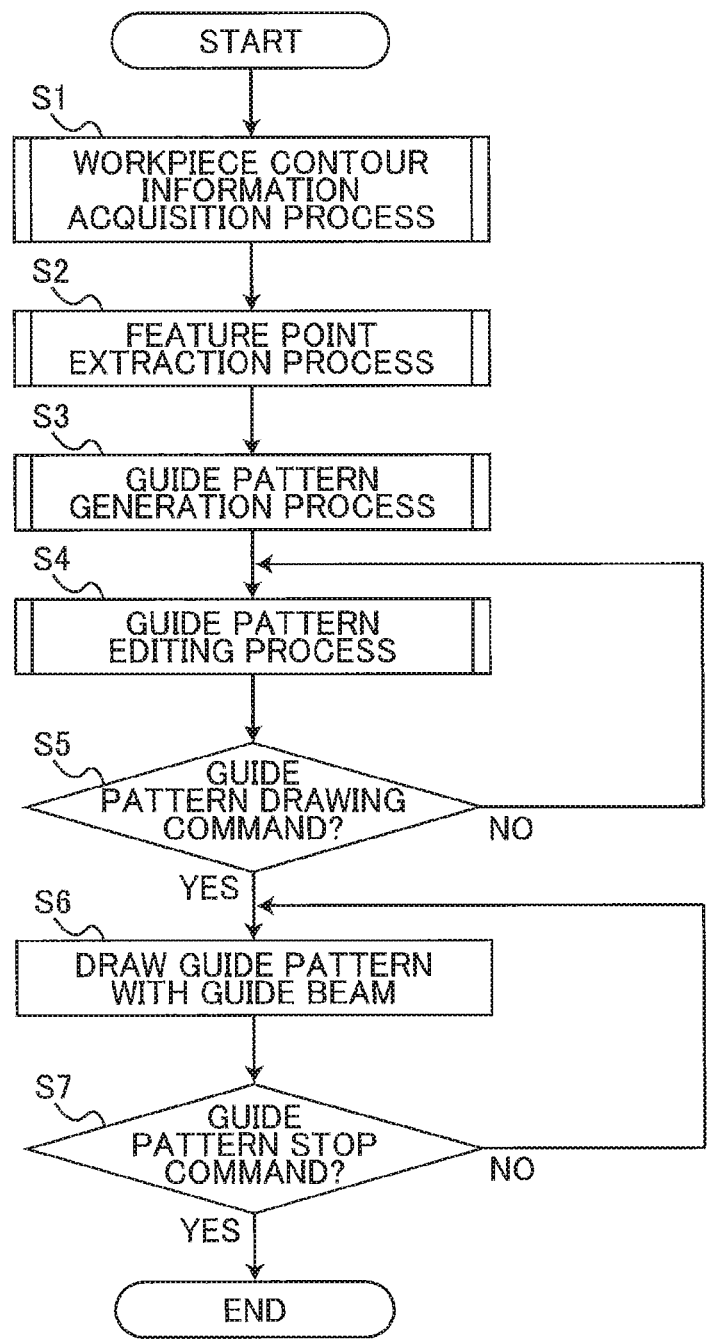
FIG. 4 is a flowchart illustrating steps in a workpiece setup assistance process implemented by a program for the workpiece setup assistance process executed by a CPU of a PC according to the embodiment.

As illustrated in FIG. 4, in S2 of the workpiece setup assistance process, the CPU 71 executes a feature point extraction process. In this process the CPU 71 analyzes the contour points O constituting the contours of the workpiece W in the workpiece contour information acquired in the workpiece contour information acquisition process of S1 to identify feature points P constituting features of the contours that can be used for reference when positioning the workpiece W. More specifically, in the feature point extraction process of S2, the CPU 71 reads the program stored in the HDD 75 for implementing the feature point extraction process and executes the program.

(Feature Point Extraction Process)

Figure 6:
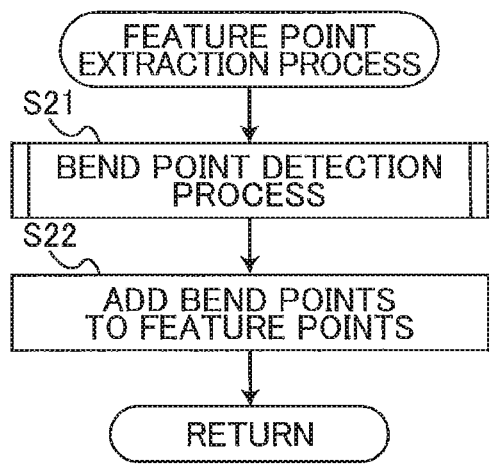
FIG. 6 is a flowchart illustrating steps in a feature point extraction process.

FIG. 6 illustrates steps in the feature point extraction process of S2 in FIG. 4. In S21 at the beginning of the feature point extraction process, the CPU 71 executes a bend point detection process. In this process, the CPU 71 analyzes the lines of contour points configuring the outline of the workpiece W to identify bend points Oc constituting the vertices of corners on the workpiece W. More specifically, the CPU 71 reads the program stored in the HDD 75 for implementing the bend point detection process (see FIG. 7) and executes the program.

(Bend Point Detection Process)

Figure 7:
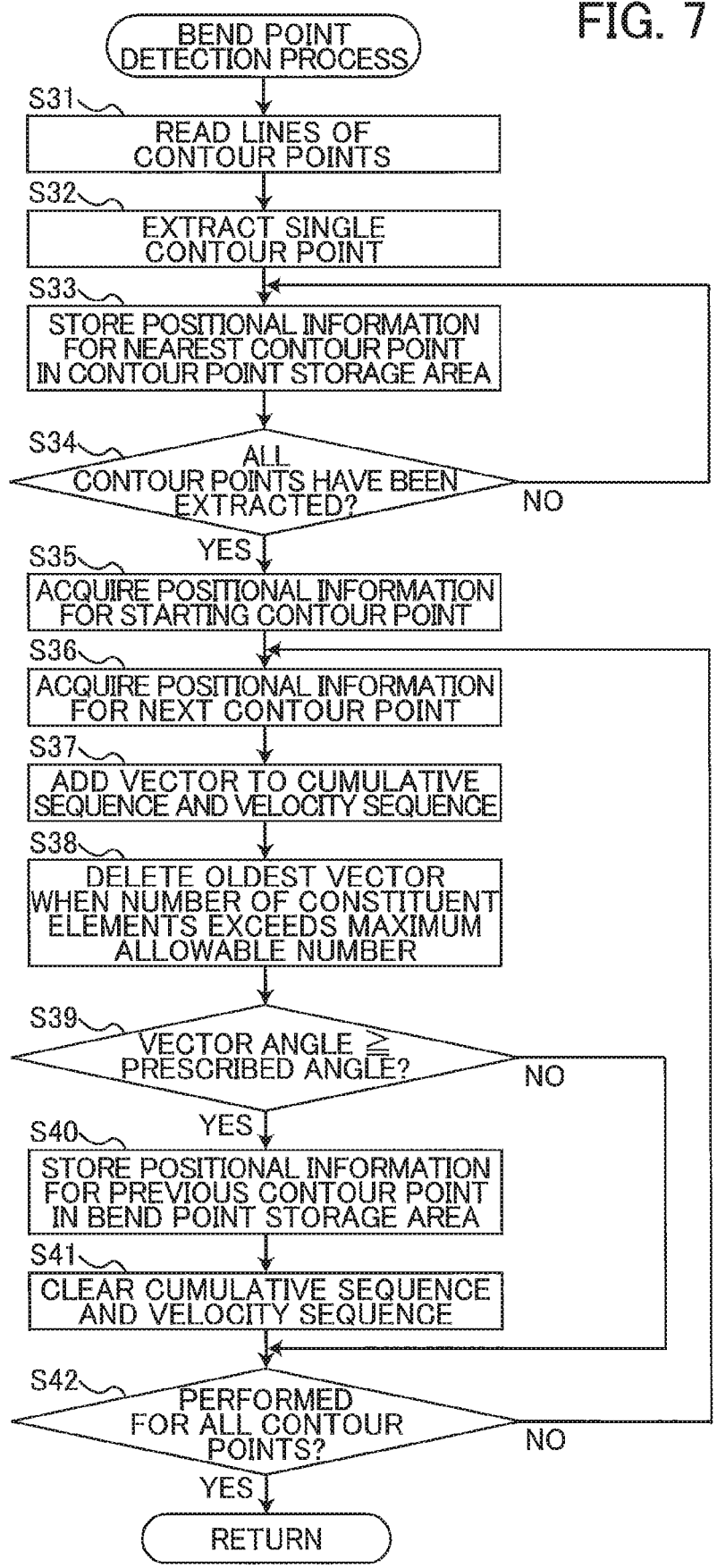
FIG. 7 is a flowchart illustrating steps in a bend point detection process.

In S31 at the beginning of the bend point detection process of FIG. 7, the CPU 71 references the workpiece contour information stored in the RAM 72 and reads information related to the lines of contour points configured of the set of contour points O.

In S32 the CPU 71 randomly extracts a single contour point O from the plurality of contour points O constituting the contours of the workpiece W in the workpiece contour information to be used as a reference point. The CPU 71 then stores positional information (X- and Y-coordinate values) for the contour point O extracted as the reference point in a contour point storage area of the RAM 72. The contour point O extracted in S32 will be also called the first contour point O. Subsequently, the CPU 71 advances to S33.

In S33 the CPU 71 identifies a single contour point O positioned closest to the reference contour point O selected in S32 from among the remaining unextracted contour points O constituting the contour of the workpiece W and stores positional information (X- and Y-coordinate values) for this closest contour point O in the contour point storage area of the RAM 72.

In S34 the CPU 71 determines whether the process of S33 has been performed for all contour points O constituting the outline of the workpiece W on the basis of the workpiece contour information and the stored content in the contour point storage area of the RAM 72. If the process has been completed for all contour points O (S34: YES), the CPU 71 advances to S35. However, if the process has not been performed for all contour points O (S34: NO), the CPU 71 sets the last contour point O identified in S33 as the reference contour point O and returns to S33 to perform the same process using the new reference contour point O.

By repeating the process in S32-S34 for the contour points O constituting the contour of the workpiece W, the contour point O extracted as the reference point transitions around the outline of the workpiece W so that the contour lines are drawn unicursally, as illustrated in FIGS. 8A and 8B. Thus, the positional information for contour points O from the first contour point O to the n-th contour point O illustrated in FIG. 8B is stored in the contour point storage area of the RAM 72 according to an order that traces the entire outline of the workpiece W unicursally.

In S35 the CPU 71 references the contour point storage area of the RAM 72 and acquires the positional information for the first contour point O stored first in this storage area as a detection target. The contour point O acquired in S35 is the contour point O selected in S32 and serves as the starting point on the contour line of the workpiece W traced unicursally. Subsequently, the CPU 71 advances to S36.

In S36 the CPU 71 references the contour point storage area of the RAM 72 and acquires positional information for the next contour point O in sequence after the contour point O just acquired as a detection target to also be a detection target. When advancing to S36 from S35, the CPU 71 acquires positional information for the second contour point O stored in the contour point storage area. The CPU 71 then advances to S37.

Figure 9A:
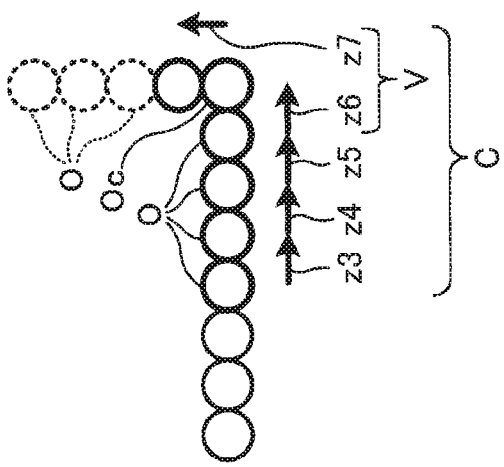
FIGS. 9A, 9B and 9C are explanatory diagrams illustrating detection of a bend point from lines of contour points.
Figure 9B:
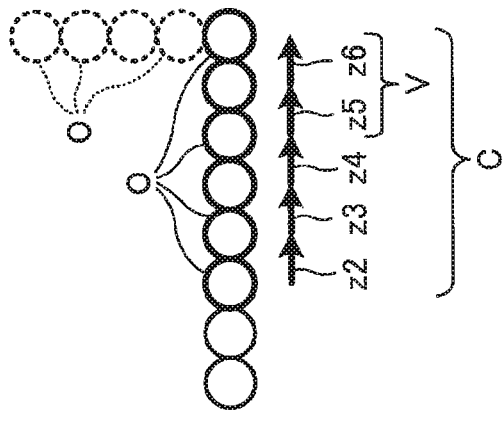
Figure 9C:
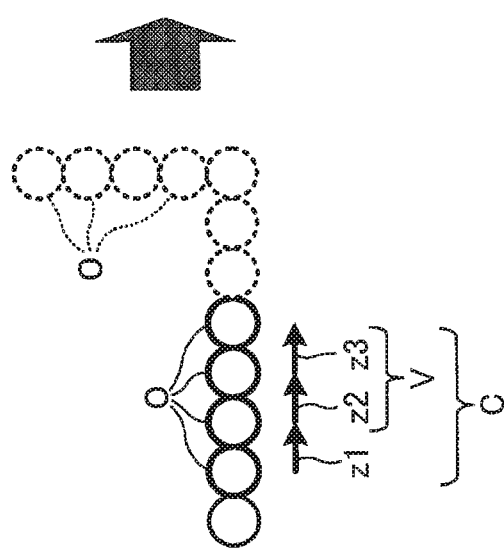

In S37 the CPU 71 finds a vector z on the basis of the positional information for the two contour points O acquired as detection targets and adds this vector z to a cumulative sequence C and a velocity sequence V. Here, the vector z indicates the direction of movement between the two consecutive contour points O that are the detection targets while tracing the contours of the workpiece W in the sequence that the contour points O are stored in the contour point storage area. As illustrated in FIGS. 9A-9C, the cumulative sequence C according to the embodiment is calculated to be the sum of a maximum of five consecutive vectors z with a maximum of six consecutive contour points O serving as the detection targets. The velocity sequence V according to the embodiment is calculated to be the sum of a maximum of two consecutive vectors z with a maximum of three consecutive contour points O serving as the detection targets. In the example of FIG. 9A, after the fourth contour point O is acquired in S35 and a vector $z3$ is found in S37, the cumulative sequence $C=z1+z2+z3$ is calculated by adding the vector $z3$ to the previously calculated cumulative sequence $C=z1+z2$, and the velocity sequence $V=z1+z2+z3$ is calculated by adding the vector $z3$ to the previously calculated velocity sequence $V=z1+z2$. After a newly found vector z is added to both the cumulative sequence C and velocity sequence V, the CPU 71 advances to S38.

In S38 the CPU 71 deletes the oldest vector z from the constituent elements of the cumulative sequence C and velocity sequence V when the number of constituent elements after adding the new vector z exceeds the maximum allowable number (five constituent elements in the cumulative sequence C and two constituent elements in the velocity sequence V). In the example of FIG. 9A described above, both the numbers of constituent elements of the cumulative sequence C and the velocity sequence V calculated in S37 is three, which is less than the maximum allowable number for the cumulative sequence but is greater than that for the velocity sequence V. Therefore, in S38 the oldest vector $z1$ is deleted from the velocity sequence V calculated in S37, so that the velocity sequence V becomes $z2+z3$, whereas none is deleted from the cumulative sequence C calculated in S37, as illustrated in the lower section of FIG. 9A.

Similarly, using the transition from FIG. 9B to FIG. 9C as an example, after a vector $z7$ illustrated in FIG. 9C is added to the cumulative sequence C and the velocity sequence V illustrated in FIG. 9B, vector $z2$, which is the oldest data element (earliest data element based on the order stored in the contour point storage area) in the cumulative sequence C, is deleted from the constituent elements of the cumulative sequence C, and vector $z5$, which is the oldest data element in the velocity sequence V, is deleted from the constituent elements of the velocity sequence V. In this way, the CPU 71 updates the constituent elements of the cumulative sequence C and velocity sequence V. The CPU 71 then advances to S39.

In S39 the CPU 71 determines whether the vector angle configured by the total value of the cumulative sequence C and the total value of the velocity sequence V to describe the angle between the cumulative sequence C and velocity sequence V is greater than or equal to a prescribed angle (ten degrees in the present embodiment). This vector angle may be found by calculating the inner product, for example. The CPU 71 advances to S40 when the vector angle is greater than or equal to the prescribed angle (S39: YES) and advances to S42 when the vector angle is less than the prescribed angle (S39: NO).

In S40 the CPU 71 sets the contour point O acquired just before the vector angle was found to be greater than or equal to the prescribed angle as a bend point Oc and stores the positional information (X- and Y-coordinate values) for the bend point Oc in a bend point storage area of the RAM 72. In the example of FIG. 9C, the previous contour point O which was acquired just before the previous vector angle (zero degrees) was calculated before the next vector angle (thirty-one degrees) was found to be greater than or equal to the prescribed angle, i.e., the seventh contour point O, indicates the vertex of a corner part constituting the contours of the workpiece W. Thus, by storing the previous contour point O acquired before the next vector angle was found to be greater than or equal to the prescribed value as a bend point Oc, as described in S40, the CPU 71 can extract the vertices of corner parts in the contours of the workpiece W. The CPU 71 then advances to S41.

In S41 the CPU 71 clears the cumulative sequence C and velocity sequence V of their constituent elements. Specifically, the CPU 71 changes the cumulative sequence C and velocity sequence V into 0 (zero). The CPU 71 then advances to S42.

In S42 the CPU 71 references the contour point storage area of the RAM 72 to determine whether the process (S36-S41) for detecting bend points Oc has been performed for all contour points O stored in the contour point storage area. When the process for detecting bend points Oc has been performed for all contour points O (S42: YES), the CPU 71 ends the bend point detection process and advances to S22 in the feature point extraction process (see FIG. 6). If the process for detecting bend points Oc has not been completed for all contour points O (S42: NO), the CPU 71 returns to S36 and repeats the process in S36-S41 on the basis of the contour point O previously acquired in S36, updating the constituent elements of the cumulative sequence C and velocity sequence V and detecting bend points Oc.

In S22 of the feature point extraction process in FIG. 6, the CPU 71 adds the bend points Oc detected from the lines of contour points configuring the outline of the workpiece W to the feature points P configuring a guide pattern. This guide pattern will be used as reference when the user positions the workpiece W. More specifically, the CPU 71 copies positional information for the bend points Oc stored in the bend point storage area of the RAM 72 to a feature point storage area of the RAM 72 as positional information for the feature points P. Subsequently, the CPU 71 ends the feature point extraction process and advances to S3 in the workpiece setup assistance process.

In S3 of the workpiece setup assistance process in FIG. 4, the CPU 71 executes a guide pattern generation process. In this process, the CPU 71 uses the results obtained from the feature point extraction process of S2 to generate a guide pattern to be drawn by the guide beam M in order that the user can suitably position the workpiece W on the workpiece support part inside the machining chamber. Here, the CPU 71 reads the program stored in the HDD 75 for implementing the guide pattern generation process (see FIG. 10) and executes this program.

(Guide Pattern Generation Process)

Figure 10:
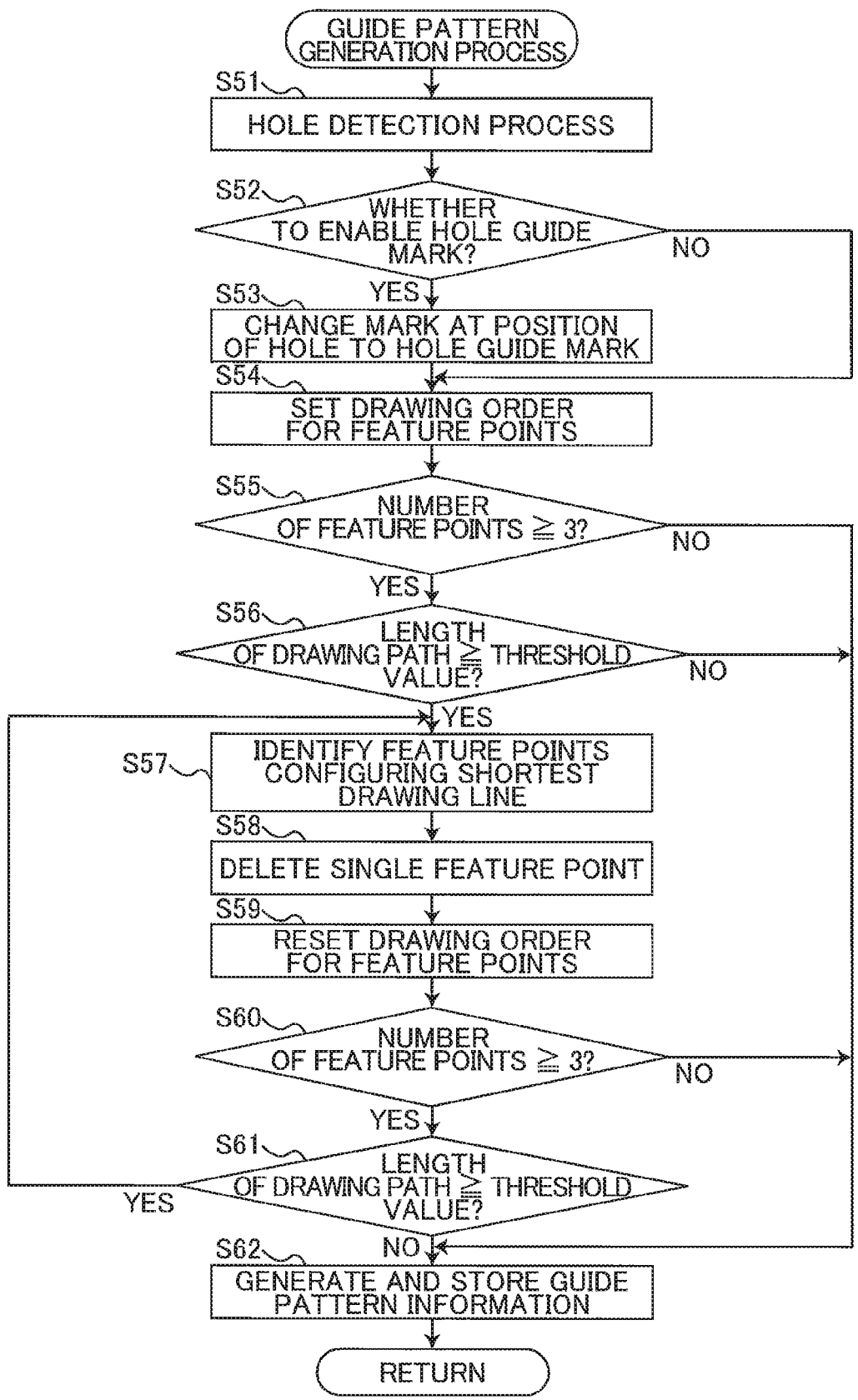
FIG. 10 is a flowchart illustrating steps in a guide pattern generation process.

In S51 at the beginning of the guide pattern generation process in FIG. 10, the CPU 71 executes a hole detection process on the imaging data or the 3D model data (the projection data for the target machining surface) of the workpiece W. Specifically, the CPU 71 executes a thresholding process, edge detection process, and the like on the imaging data or the like to detect the presence, position, size, and the like of a hole Hw (or holes Hw) in the target machining surface of the workpiece W.

In S52 the CPU 71 displays a message on the LCD 77 asking the user whether or not to draw a hole guide mark Mh with the guide beam M as a guide pattern for adjusting the position of each hole Hw in the workpiece W in order to determine whether to enable the hole guide mark Mh. The user performs an operation on the input operation unit 76 to indicate whether or not to enable the hole guide mark Mh, and the CPU 71 makes the determination in S52 on the basis of the operation signal received from the input operation unit 76. If the user indicates a desire to enable the hole guide mark Mh (S52: YES), the CPU 71 advances to S53. However, if the user does not want to enable the hole guide mark Mh (S52: NO), the CPU 71 jumps to S54.

In S53 the CPU 71 changes the mark in the guide pattern indicating the position of the hole Hw in the workpiece W according to the process results of the hole detection process in S51 to the hole guide mark Mh. At this time, the CPU 71 stores positional information for points required to draw the hole guide mark Mh in the feature point storage area of the RAM 72. Subsequently, the CPU 71 advances to S54.

Figure 11:
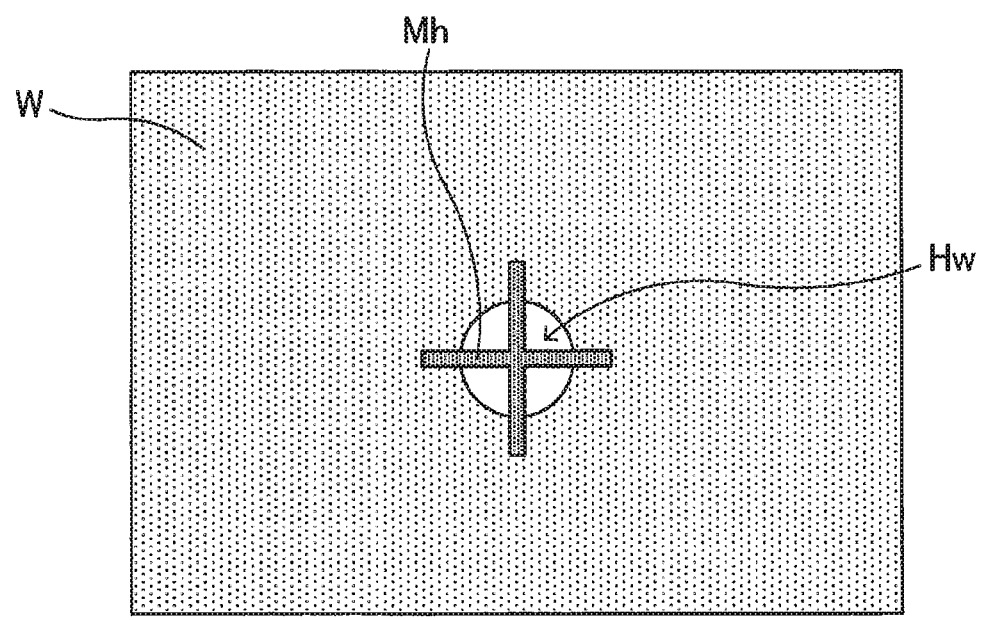
FIG. 11 is an explanatory diagram illustrating an example of a hole guide mark.

As illustrated in FIG. 11, the hole guide mark Mh is drawn by the guide beam M so as to indicate the position of the hole Hw relative to the workpiece W while extending at least partially onto the surface of the workpiece W. The hole guide mark Mh is generated on the basis of the center point and size of the hole Hw identified in the hole detection process of S51 so as to form a cross that intersects at the center point of the hole Hw. On the basis of the size of the hole Hw, the lengths of the vertical and horizontal lines constituting the hole guide mark Mh are set slightly larger than the diameter of the hole Hw.

In S54 the CPU 71 references the feature point storage area of the RAM 72 and sets a drawing order for feature points P required for drawing the guide pattern on the basis of the positional information for each feature point P constituting the guide pattern. The CPU 71 sets a drawing order forming a path that passes through each of the feature points P constituting the guide pattern exactly once. After setting the drawing order for the feature points P, the CPU 71 advances to S55.

Figure 12A:
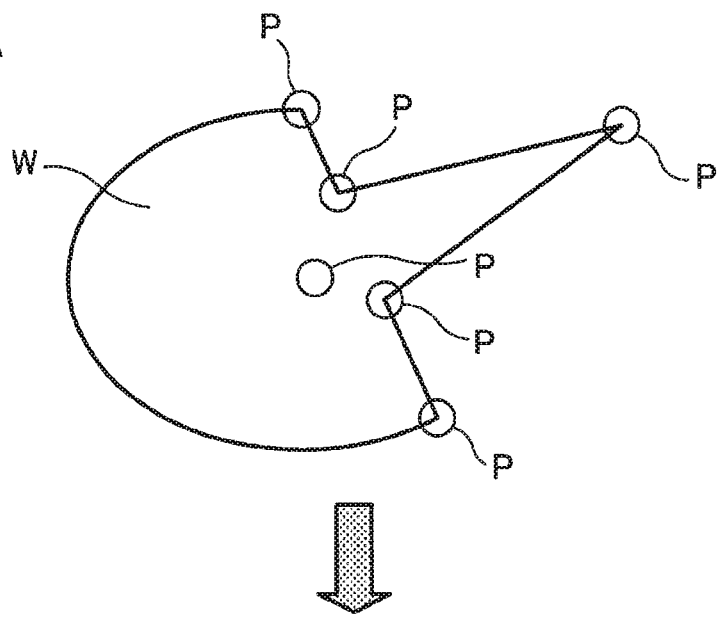
FIGS. 12A, 12B and 12C are explanatory diagrams illustrating a method of setting a drawing order for feature points configuring a guide pattern.
Figure 12B:
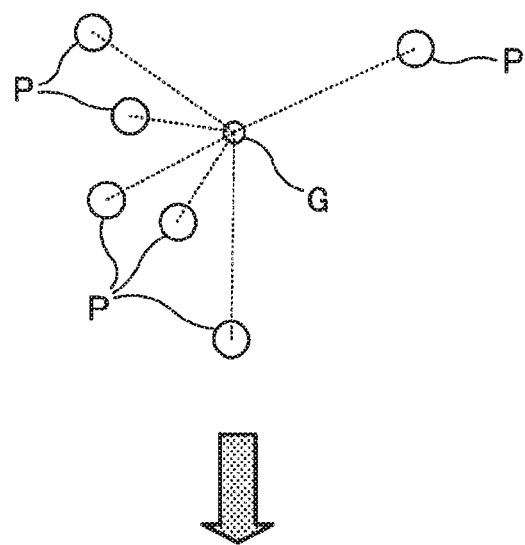
Figure 12C:
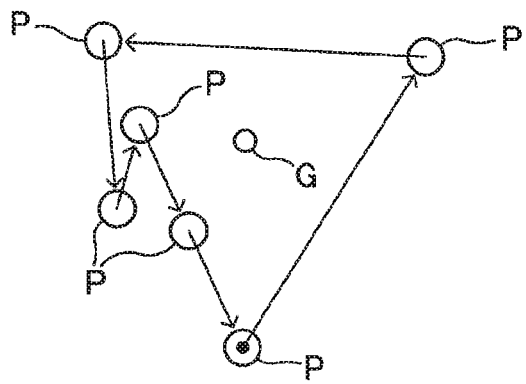

Here, the method of setting the drawing order for the feature points P in S54 will be described with reference to FIGS. 12A-12C. In the example of FIGS. 12A-12C, six feature points P are to be drawn on the basis of the contours of the workpiece W, and in S54 the CPU 71 sets the drawing order to produce a path that passes exactly once through each of the six feature points P. Upon advancing to S54, the CPU 71 first identifies the position of a center of gravity G for all feature points P (see FIG. 12B) according to the positional information for the feature points P stored in the feature point storage area of the RAM 72. Next, the CPU 71 calculates the distance between each feature point P and the center of gravity G on the basis of the positional information for the center of gravity G identified above and the positional information for each feature point P. Next, the CPU 71 sorts the feature points P on the basis of their distance from the center of gravity G in order beginning from the greatest distance and sets the drawing order for the feature points P to this order. As a result, the CPU 71 can set a drawing order that visits each feature point P of the guide pattern exactly once while minimizing the length of the entire path, as illustrated in FIG. 12C.

In S55 the CPU 71 references the feature point storage area of the RAM 72 to determine whether the number of feature points P constituting the guide pattern is greater than or equal to three. If the number of feature points P is greater than or equal to three (S55: YES), the CPU 71 advances to S56. However, if the number of feature points P is less than three (S55: NO), in S62 the CPU 71 generates guide pattern information on the basis of the position information for each feature point P and the drawing order at the current point in time and stores this guide pattern information in the RAM 72. Subsequently, the CPU 71 ends the guide pattern generation process and advances to S4 in the workpiece setup assistance process (see FIG. 4).

When advancing to S56, the CPU 71 determines whether the length of the drawing path for drawing the guide pattern is greater than or equal to a threshold value on the basis of the positional information for each feature point P in the feature point storage area of the RAM 72 and the drawing order for the feature points P. Specifically, the CPU 71 first calculates the total length of the path required for drawing the guide pattern with the guide beam M on the basis of the positional information of each feature point P and the drawing order for the feature points P. Next, the CPU 71 determines whether this drawing length is greater than or equal to the threshold value. The threshold value is set on the basis of a frame rate at which the guide pattern has no flickering owing to the effect of afterimage. Frame rate is a term indicating the number of times each second that the guide pattern is drawn. For example, the frame rate may be set to 15 fps (frames per second). When the length of the drawing path for the guide pattern is greater than or equal to the threshold value (S56: YES), the CPU 71 advances to S57. However, if the length of the drawing path is less than the threshold value (S56: NO), in S62 the CPU 71 generates guide pattern information on the basis of the positional information for each feature point P and the drawing order at the current point in time and stores this guide pattern information in the RAM 72. Subsequently, the CPU 71 ends the guide pattern generation process and advances to S4 in the workpiece setup assistance process (see FIG. 4).

In S57 the CPU 71 identifies feature points P configuring the shortest drawing line among all drawing lines constituting the guide pattern (the shortest length of a path connecting two feature points P in conformance with the drawing order) on the basis of the positional information for each feature point P in the feature point storage area of the RAM 72 and the drawing order of the feature points P.

The CPU 71 identifies a pair of feature points P positioned at the both ends of the shortest drawing line, and selects one of the identified feature points P. Here, each of the identified feature points P configures two drawing lines. In other words, the shortest drawing line connects the identified feature points P, and two other drawing lines respectively extends from the identified feature points P. In the present embodiment, the CPU 71 selects one drawing line having a shorter length from the two other drawing lines, and identifies single feature point P positioned at one end of the identified drawing line from the identified feature points P. The CPU 71 then advances to S58.

In S58 the CPU 71 deletes the positional information for the single feature point P identified in S57 from the feature point storage area of the RAM 72. When the user adjusts the position of the workpiece W while referencing the feature points P constituting the guide pattern, error in positional adjustments can be reduced more reliably when the user references wider areas between feature points P rather than narrow areas between feature points P. After deleting the positional information on the single feature point P identified in S57, the CPU 71 advances to S59.

In S59 the CPU 71 resets the drawing order for the feature points P in order to link the feature points P positioned before and after the feature point P that was deleted in S58. By eliminating a single feature point P constituting the shortest drawing line to reduce the length of the drawing path for the guide pattern, the CPU 71 can configure the guide pattern so as to maintain precision in adjusting the position of the workpiece W while enabling the user to easily perceive the overall image. After resetting the drawing order in S59, the CPU 71 advances to S60.

In S60 the CPU 71 determines whether the number of feature points P constituting the guide pattern resulting from steps S57-S59 is greater than or equal to three. If the number of feature points P in the guide pattern at the current point is three or greater (S60: YES), the CPU 71 advances to S61. However, if the number of feature points P in the current guide pattern is less than three (S60: NO), in S62 the CPU 71 generates a guide pattern on the basis of the positional information for each feature point P and the drawing order at the current point in time and stores this guide pattern information in the RAM 72. Subsequently, the CPU 71 ends the guide pattern generation process and advances to S4 in the workpiece setup assistance process (see FIG. 4).

In S61 the CPU 71 determines whether the length of the drawing path for drawing the guide pattern resulting from the process in S57-S60 is greater than or equal to the threshold value. The process in S61 is identical to that in S56, except that the guide pattern targeted in S61 is the pattern resulting from the process in S57-S60. If the length of the drawing path for the current guide pattern is greater than or equal to the threshold value (S61: YES), the CPU 71 returns to S57 and repeats the process in S57-S60 involving deletion of a feature point P constituting the guide pattern. However, if the length of the drawing path for the current guide pattern is less than the threshold value (S61: NO), in S62 the CPU 71 generates a guide pattern on the basis of the positional information for each feature point P and the drawing order at the current point in time and stores this guide pattern information in the RAM 72. Subsequently, the CPU 71 ends the guide pattern generation process and advances to S4 in the workpiece setup assistance process (see FIG. 4).

In S4 of FIG. 4, the CPU 71 executes a guide pattern editing process. In this process, the CPU 71 allows the user to edit the guide pattern generated in the process of S3. Here, the CPU 71 reads the program stored in the HDD 75 for implementing the guide pattern editing process (see FIG. 13) and executes the program.

(Guide Pattern Editing Process)

Figure 13:
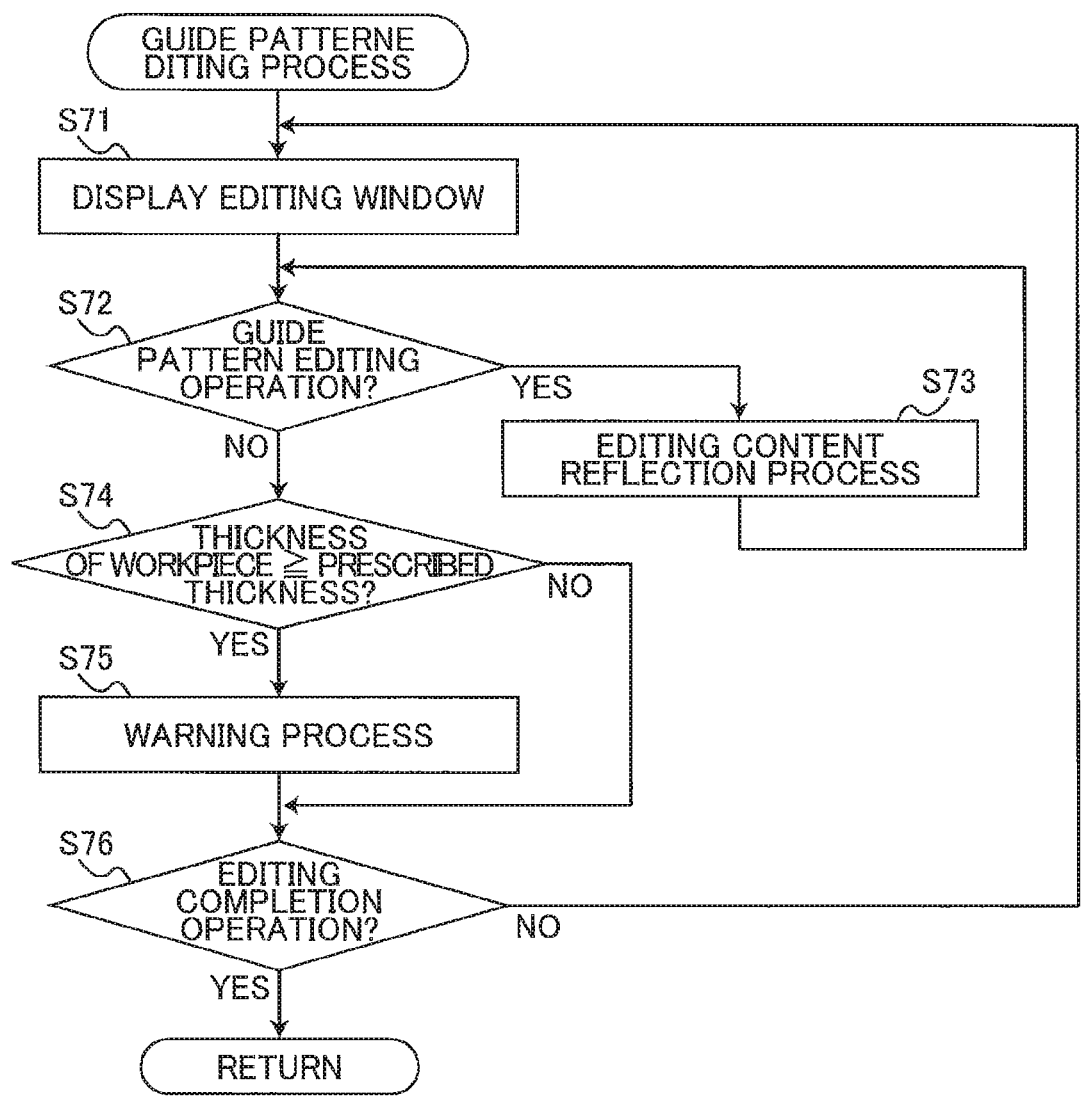
FIG. 13 is a flowchart illustrating steps in a guide pattern editing process.

In S71 of FIG. 13 at the beginning of the guide pattern editing process, the CPU 71 displays an editing window 80 on the LCD 77 for enabling the user to edit the guide pattern generated in the guide pattern generation process of S3. After displaying the editing window 80 on the LCD 77, the CPU 71 advances to S72.

(Description of the Editing Window)

Figure 14:
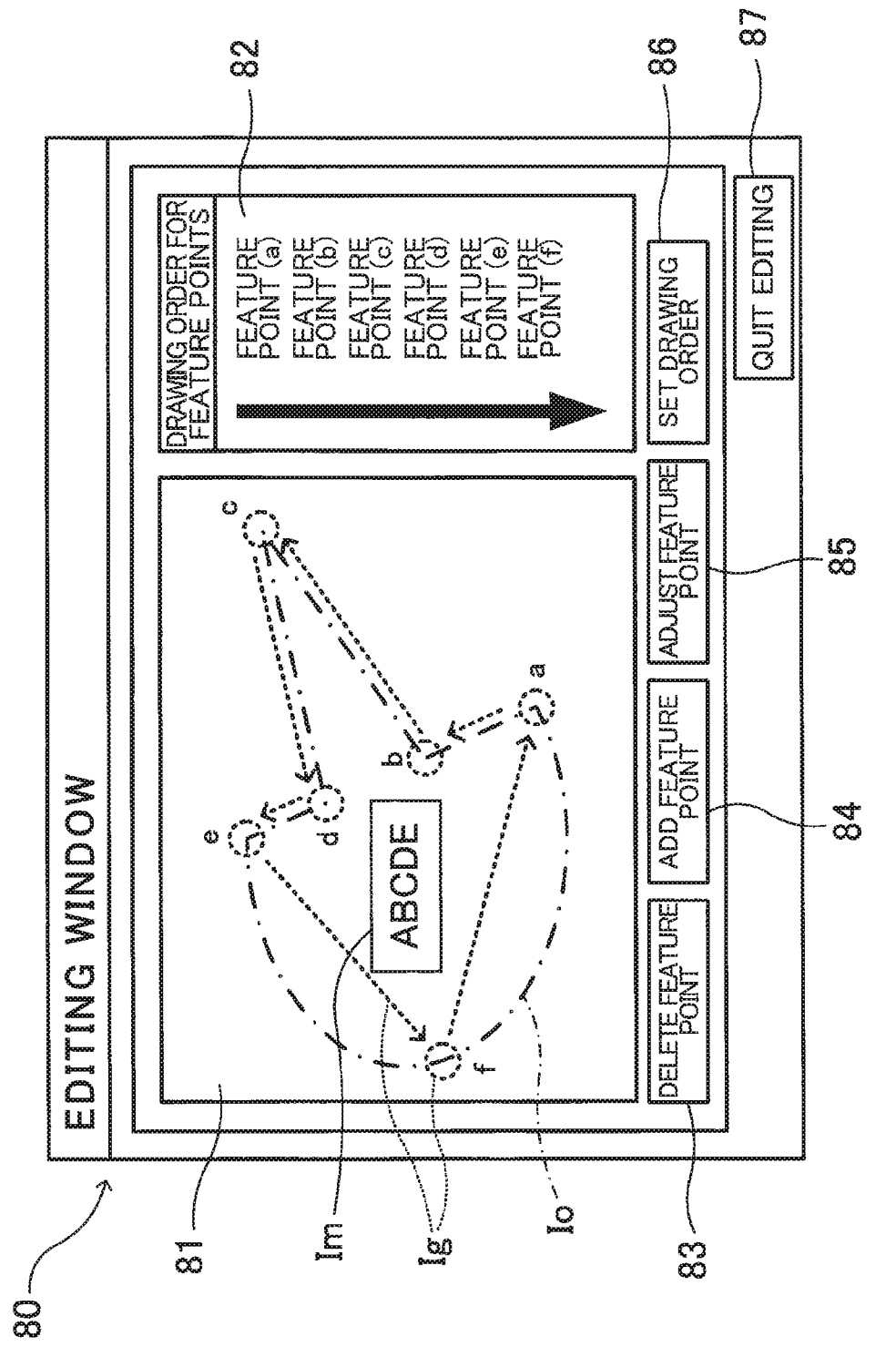
FIG. 14 is an explanatory diagram illustrating an example of an editing window.

Here, the structure of the editing window 80 displayed on the LCD 77 in S71 will be described with reference to FIG. 14. As illustrated in FIG. 14, the editing window 80 includes a data content display section 81, a drawing order display section 82, a DELETE FEATURE POINT button 83, an ADD FEATURE POINT button 84, an ADJUST FEATURE POINT button 85, a SET DRAWING ORDER button 86, and a QUIT EDITING button 87. The display content in the data content display section 81 and drawing order display section 82 helps the user in operating the input operation unit 76 to edit the guide pattern, and the editing window 80 receives operations in the buttons 83-86 to implement the various editing processes on the guide pattern.

The data content display section 81 is disposed in the left side of the editing window 80. The display in the data content display section 81 includes a workpiece contour image Io, a guide pattern image Ig, and a machining content image Im that are superimposed on each other. The workpiece contour image Io in the data content display section 81 is displayed on the basis of the workpiece contour information acquired in the workpiece contour information acquisition process of S1 and indicated the outline of the workpiece W with one-dot chain lines. The guide pattern image Ig in the data content display section 81 is displayed on the basis of the guide pattern information generated in the guide pattern generation process of S3 with dashed arrows in a color different from that of the workpiece contour image Io. When guide pattern information is edited in the guide pattern editing process of S4, the display state of the guide pattern image Ig changes on the basis of the editing content. The machining content image Im is an image specifying machining content used when marking the machining surface of the workpiece W. If machining data created in the data creation process exists, the machining content image Im is displayed in a color different from those of the workpiece contour image Io and guide pattern image Ig. Since the workpiece contour image Io, guide pattern image Ig, and machining content image Im are all based on information defined in the same Cartesian coordinate system configured of X- and Y-axes (workpiece contour information, guide pattern information, and machining data), all three images can be superimposed in the same Cartesian coordinate system.

The drawing order display section 82 is disposed in the right side of the editing window 80 and lists the feature points P constituting the guide pattern in the drawing order on the basis of the guide pattern information generated in the guide pattern generation process of S3. As illustrated in FIG. 14, identification names such as "feature point (a)" may be added in the drawing order display section 82 to distinguish each feature point P. Alternatively, the positional information (X- and Y-coordinate values) for each feature point P may be displayed in the drawing order display section 82 to distinguish each feature point P.

The DELETE FEATURE POINT button 83 is disposed in the lower portion of the data content display section 81. The user selects the DELETE FEATURE POINT button 83 through an operation on the input operation unit 76 when the user wishes to delete a feature point P from the guide pattern. More specifically, the CPU 71 initiates an editing process for deleting a feature point P when the DELETE FEATURE POINT button 83 is operated. In the editing process, the user can perform operations on the input operation unit 76 related to the data content display section 81 and drawing order display section 82 to select and delete a single feature point P from the guide pattern.

The ADD FEATURE POINT button 84 is disposed in the lower portion of the data content display section 81. The user selects the ADD FEATURE POINT button 84 through an operation on the input operation unit 76 in order to add a single feature point P to a desired position as a feature point P constituting the guide pattern. Specifically, when the user operates the ADD FEATURE POINT button 84, the CPU 71 initiates an editing process for adding a feature point P to the guide pattern. In this process, the user operates the input operation unit 76 to specify a desired position in the data content display section 81, and the CPU 71 adds a feature point P to the specified position. Note that the place of the newly added feature point P in the drawing order may be set according to the same process described in S54 (see FIG. 12) or may be set according to another method.

The ADJUST FEATURE POINT button 85 is disposed in the lower portion of the data content display section 81. The user selects the ADJUST FEATURE POINT button 85 through an operation on the input operation unit 76 in order to move a feature point P constituting the guide pattern to a desired position. Specifically, when the user selects the ADJUST FEATURE POINT button 85, the CPU 71 initiates an editing process for adjusting the position of a feature point P. In this process, the user performs operations on the input operation unit 76 to select a single feature point P in the data content display section 81 to be moved. Next, through another operation on the input operation unit 76 the user specifies a desired position in the data content display section 81 to identify the positional destination of the feature point P. The user may also use the input operation unit 76 to drag the feature point P within the data content display section 81 in the editing process initiated by selecting the ADJUST FEATURE POINT button 85.

The SET DRAWING ORDER button 86 is disposed in the lower portion of the drawing order display section 82. The user selects the SET DRAWING ORDER button 86 through an operation on the input operation unit 76 in order to change the place of a single feature point P in the drawing order for the guide pattern to a different place. Specifically, when the user selects the SET DRAWING ORDER button 86, the CPU 71 initiates an editing process for editing the drawing order of the feature points P. In this process, the user operates the input operation unit 76 to select a single feature point P in the drawing order display section 82 whose place in the drawing order the user wishes to modify. Once the feature point P is selected, the user repeatedly operates the SET DRAWING ORDER button 86 with the input operation unit 76, causing the selected feature point P to shift repeatedly upward or repeatedly downward until the feature point P is in the desired position.

The QUIT EDITING button 87 is disposed in the lower right corner of the editing window 80. The user selects the QUIT EDITING button 87 using the input operation unit 76 when finished editing the guide pattern.

In S72 of the guide pattern editing process illustrated in FIG. 13, the CPU 71 determines on the basis of operation signals received from the input operation unit 76 whether a guide pattern editing operation was performed. A guide pattern editing operation includes at least the operations on the buttons 83-86. Thus, the CPU 71 makes the determination in S72 by detecting whether one of these buttons 83-86 was operated. When a guide pattern editing operation was performed (S72: YES), the CPU 71 advances to S73. However, if a guide pattern editing operation was not performed (S72: NO), the CPU 71 advances to S74.

In S73 the CPU 71 executes art editing content reflection process for updating the guide pattern information to reflect the content of edits made on the basis of operations on the buttons 83-86 in the guide pattern information. Subsequently, the CPU 71 returns to S72 to accept further edits to the guide pattern.

In S74 the CPU 71 determines whether the thickness of the workpiece W that is the target of the marking process is greater than or equal to a prescribed thickness. Specifically, the CPU 71 first calculates the thickness of the workpiece W using the workpiece shape information received in S11 of the workpiece contour information acquisition process (S1) and compares this calculated thickness to a prescribed thickness. Here, the prescribed thickness may be determined on the basis of the viewpoint of a user actually observing the guide pattern drawn by the guide beam M (the distance from or height relative to the workpiece W) and set to a value at which the thickness of the workpiece W is thought to have a high probability of obstructing the user's line of sight to the guide pattern. For example, the CPU 71 may calculate the prescribed thickness on the basis of a predetermined standard position for the user's viewpoint and the position of each feature point in the guide pattern. The CPU 71 advances to S75 when the thickness of the workpiece W is greater than or equal to the prescribed thickness (S74: YES) and advances to S76 when the thickness of the workpiece W is less than the prescribed thickness (S74: NO).

In S75 the CPU 71 executes a warning process for displaying a warning message on the LCD 77, such as "Visibility of the guide pattern is poor because the workpiece W is obstructing the user's line of sight to the guide pattern." At this time, the CPU 71 can also display which points of the guide pattern in particular will likely be difficult to see. In addition, the points in the guide pattern that are likely to be obscured from the user's view may be displayed in a different color or flashed in the warning message, for example. Upon seeing this warning message, the user can recognize that portions of the guide pattern are likely to be obscured and can take the appropriate steps to further edit the guide pattern (delete or move feature points P, for example). After displaying the warning message on the LCD 77, the CPU 71 advances to S76.

In S76 the CPU 71 determines on the basis of operation signals from the input operation unit 76 whether the user performed an editing completion operation to quit the editing process. Specifically, the CPU 71 determines on the basis of operation signals received from the input operation unit 76 whether the QUIT EDITING button 87 was operated. When an editing completion operation was performed (S76: YES), the CPU 71 ends the guide pattern editing process and advances to S5 in the workpiece setup assistance process (see FIG. 4). However, if an editing completion operation was not performed (S76: NO), the CPU 71 returns to S71 and accepts editing operations in the editing window 80.

Here, the remainder of the workpiece setup assistance process beginning from S5 of FIG. 4 will be described. In S5 the CPU 71 determines whether a command to draw the guide pattern (guide pattern drawing command) was received. The guide pattern drawing command is a control command inputted into the CPU 71 when the user performs a prescribed operation on the input operation unit 76 that instructs the CPU 71 to use the guide beam M to draw the guide pattern generated through the guide pattern generation process (S3) and the guide pattern editing process (S4).

Hence, the CPU 71 executes the determination process in S5 on the basis of operation signals received from the input operation unit 76. When a guide pattern drawing command was received (S5: YES), the CPU 71 advances to S6. While a guide pattern drawing command has not been received (S5: NO), the CPU 71 returns to the guide pattern editing process (S4) and repeats S4 and S5 until a guide pattern drawing command is received.

In S6 the CPU 71 outputs the guide pattern drawing command and the guide pattern information available at the time the guide pattern drawing command was issued to the laser controller 5 of the laser machining unit 1 to initiate the process of drawing the guide pattern with the guide beam M. Subsequently, the CPU 71 of the PC 7 advances to S7.

At this time, upon receiving the guide pattern information and the guide pattern drawing command from the PC 7, the CPU 61 of the laser controller 5 draws the guide pattern over the workpiece support part in the machining chamber by controlling the guide beam unit 17 and galvano scanner 19 on the basis of the positional information for each feature point P constituting the guide pattern and the drawing order of the feature points P. Specifically, the CPU 61 of the laser controller 5 outputs control parameters such as drive information for the guide beam unit 17 to the guide beam driver 58 in order to control emission of the guide beam M from the guide beam unit 17. At the same time, the CPU 61 of the laser controller 5 outputs the positional information for each feature point P to the galvano controller 56 and galvano drivers 23 according to the drawing order of the feature points P constituting the guide pattern in order to control the driving of the galvano scanner 19. Through this process, the guide beam M emitted from the guide beam unit 17 is scanned over the workpiece support part in the machining chamber so as to cycle through all of the feature points P constituting the guide pattern, one at a time.

In S7 the CPU 71 of the PC 7 determines whether a command to stop the guide pattern (guide pattern stop command) has been received. The guide pattern stop command is a control command instructing the CPU 71 to stop drawing the guide pattern with the guide beam M that was initiated in S6. A guide pattern stop command is inputted into the CPU 71 when the user performs a prescribed operation using the input operation unit 76. Thus, the CPU 71 performs the determination process of S7 on the basis of operation signals received from the input operation unit 76. When a guide pattern stop command has been received (S7: YES), the CPU 71 ends the workpiece setup assistance process. While a guide pattern stop command has not been received (S7: NO), the CPU 71 returns to S6 and continues drawing the guide pattern with the guide beam M until a guide pattern stop command has been received.

With the configuration described above, the laser machining apparatus 100 can draw a guide pattern with the guide beam M to indicate a suitable setup position for the workpiece W in relation to the marking process, enabling the user to easily adjust the workpiece W to a suitable position while referencing the guide pattern. The guide pattern is generated through the workpiece contour information acquisition process (S1) and the feature point extraction process (S2) and is configured such that the feature points P can be aligned with feature parts in the contours of the actual workpiece W (the vertices of corner parts in the outline of the workpiece W; see FIGS. 12 and 14). Accordingly, by referencing these feature parts in the actual workpiece W and the feature points P in the guide pattern, the user can more precisely arrange the workpiece W in a suitable position for marking.

As described above, the laser machining apparatus 100 according to the present embodiment has the laser oscillation unit 12, galvano scanner 19, guide beam unit 17, laser controller 5, and PC 7, and can perform marking on the surface of a workpiece W by controlling the galvano scanner 19 to scan the laser beam L irradiated from the laser oscillation unit 12. In addition, by using the galvano scanner 19 to scan the guide beam M emitted from the guide beam unit 17, the laser machining apparatus 100 can use a visible guide beam M to draw the machining content, a guide pattern, or the like for the marking process to be performed with the laser beam L.

In the feature point extraction process (S2) the laser machining apparatus 100 extracts parts of the outline of the workpiece W as feature points P on the basis of workpiece contour information acquired in the workpiece contour information acquisition process (S1) and generates a guide pattern indicating a setup position of the workpiece W on the basis of the extracted feature points P (S3). The laser machining apparatus 100 can draw the guide pattern with the guide beam M by controlling the guide beam unit 17 and galvano scanner 19 on the basis of the generated guide pattern information.

Hence, since the laser machining apparatus 100 draws a guide pattern with the guide beam M on the basis of the actual contours of the workpiece W, the user can suitably adjust the position of the workpiece W while referencing the actual contours of the workpiece W and the guide pattern, even when the workpiece W has a complex shape, thereby improving the precision for adjusting the position of the workpiece W. By improving precision in adjusting the position of the workpiece W in this way, the laser machining apparatus 100 can more reliably mark the workpiece W in the desired position.

As illustrated in FIG. 9, in the feature point extraction process (S2) the CPU 71 generates vectors z specifying segments in the sequence of contour points O that make up the outline of the workpiece W on the basis of the workpiece contour information and, using the cumulative sequence C and velocity sequence V based on these vectors z, detects bend points Oc as contour points O at which the amount of change in the cumulative sequence C and velocity sequence V exceeds a prescribed value. The CPU 71 sets the detected bend points Oc as feature points P, whereby the laser machining apparatus 100 can generate a guide pattern that includes corner parts or other feature parts in the contours of the workpiece W, for example. Using these feature parts in the contours of the workpiece W, the laser machining apparatus 100 can implement a process for adjusting the position of the workpiece W in reference to the guide pattern, thereby reliably improving the precision for adjusting the position of the workpiece W.

Figure 5:
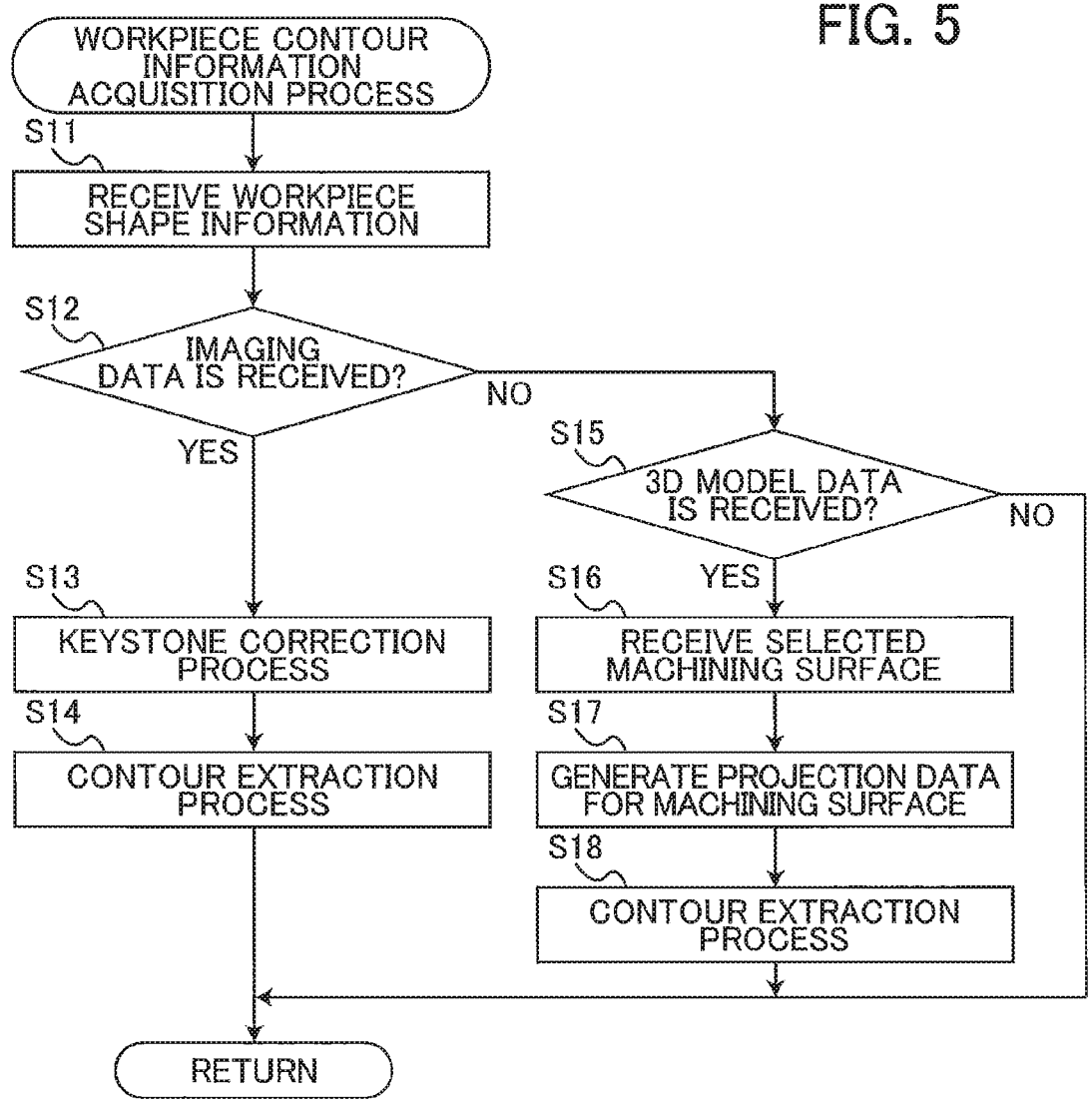
FIG. 5 is a flowchart illustrating steps in a workpiece contour information acquisition process.

As illustrated in FIG. 5, in the workpiece contour information acquisition process (S1) the CPU 71 receives workpiece shape information describing the shape of the workpiece W and acquires workpiece contour information on the basis of this workpiece shape information. Accordingly, the CPU 71 can acquire workpiece contour information from 3D model data, drawing data, or the like for the workpiece W. Hence, the laser machining apparatus 100 can extract feature points P on the basis of workpiece contour information for reproducing the contours of the actual workpiece W with high precision in order to generate a guide pattern. Thus, the laser machining apparatus 100 can improve the compatibility of the guide pattern with the outline of the workpiece W, thereby further improving precision in adjusting the position of the workpiece W.

Further, the laser machining apparatus 100 receives imaging data for the workpiece W captured by the imaging unit 57 as the workpiece shape information and performs a digital image process (S13 and S14) on the imaging data to produce the workpiece contour information. Accordingly, the laser machining apparatus 100 can acquire workpiece contour information that reproduces the outline of the actual workpiece W with great precision, without having to use the drawing data or the like. Further, the laser machining apparatus 100 can extract feature points P to generate a guide pattern on the basis of the workpiece contour information that reproduces the outline of the actual workpiece W with great precision, thereby easily improving the compatibility of the guide pattern with the outline of the workpiece W and further improving the precision for adjusting the position of the workpiece W.

As illustrated in FIG. 10, in the guide pattern generation process (S3) the CPU 71 generates a guide pattern corresponding to the contours of the workpiece W. The guide beam M draws the guide pattern to indicate the setup position for the workpiece W by tracing a path that includes the plurality of feature points P extracted in the feature point extraction process (S2). The laser machining apparatus 100 can facilitate the user in adjusting the position of the workpiece W with reference to the guide pattern, and specifically by matching the parts in the guide pattern having feature points P with corresponding feature parts of the actual workpiece W, thereby enabling the user to adjust the position of the workpiece W with greater accuracy.

As described above, the guide pattern in the present embodiment is drawn by the galvano scanner 19 that scans the guide beam M emitted from the guide beam unit 17. However, if the total length of the path passing through all feature points P of the guide pattern is greater than or equal to the prescribed length, the user may no longer perceive the light from the guide beam M at the initial feature points P in the drawing order while the guide beam M is emitting light toward the last feature points P in the drawing order, causing the parts of the guide pattern at the feature points P to appear to flicker. In such a case, the visibility of the guide pattern is worse than when the parts of the guide pattern corresponding to the feature points P appear to be constantly drawn. As a result, positioning precision will likely be worse when attempting to adjust the position of the workpiece W while referencing this guide pattern.

As illustrated in FIG. 10, the laser machining apparatus 100 according to the embodiment deletes some of the feature points P (S58) that were extracted in the feature point extraction process (S2) when the length of the drawing path is greater than or equal to the threshold value (S56: YES) and generates a guide pattern configured of the remaining feature points P. In this way, the laser machining apparatus 100 can shorten the path of the guide beam M for drawing the guide pattern, enabling the guide beam M to draw the entire image of the guide pattern with no flickering. Thus, the laser machining apparatus 100 can implement the process for adjusting the position of the workpiece W with reference to a guide pattern that uses some of the plurality of feature points P extracted in the feature point extraction process (S2), thereby helping to improve the precision for adjusting the position of the workpiece W.

As illustrated in FIG. 12, in the guide pattern generation process (S3) the CPU 71 sets a drawing order for the plurality of feature points P (S54) so as to minimize the total length of the path that passes exactly once through each of the feature points P extracted in the feature point extraction process (S2) and generates the guide pattern according to this drawing order. Accordingly, the CPU 71 can generate a guide pattern that the guide beam M can draw with no flickering and that includes as many feature points P as possible, thereby helping to improve the precision by which the user adjusts the position of the workpiece W while referencing the guide pattern.

In the guide pattern generation process (S3) illustrated in FIG. 10, the CPU 71 detects a hole Hw in the workpiece W through the hole detection process (S51) and generates a guide pattern in which the mark specifying a position corresponding to the hole Hw is changed to the hole guide mark Mh (S53). As illustrated in FIG. 11, the hole guide mark Mh has a cross shape specifying the position of the hole Hw in the workpiece W and is generated so that the ends of its vertical and horizontal lines extend onto the surface of the workpiece W. Therefore, the laser machining apparatus 100 can prevent the guide beam M from being irradiated only inside the hole Hw of the workpiece W, thereby preventing the hole guide mark Mh from becoming invisible due to the presence of the workpiece W. That is, the laser machining apparatus 100 can employ not only portions of the guide pattern corresponding to feature points P, but also the hole Hw of the workpiece W and the hole guide mark Mh in the guide pattern for reference, further improving the precision for adjusting the position of the workpiece W.

In the guide pattern editing process (S4), the laser machining apparatus 100 can display the editing window 80 having the data content display section 81 on the LCD 77. As illustrated in FIG. 14, the data content display section 81 has the workpiece contour image Io based on the workpiece contour information, the machining content image Tin based on the machining data, and the guide pattern image Ig based on the guide pattern information that can be superimposed on each other in the data content display section 81. With this configuration, the user viewing the display content in the data content display section 81 can accurately discern the relative positions of the contours of the workpiece W, the machining content in the machining data, and the guide pattern. Further, since the laser machining apparatus 100 displays the guide pattern over the contours of the workpiece W in the data content display section 81, the user can easily adjust the drawing position of the guide pattern relative to the contours of the workpiece W, enabling the generation of a guide pattern that facilitates positional adjustments of the workpiece W.

As illustrated in FIG. 14, the drawing order for the guide pattern image Ig is indicated both in the data content display section 81 of the editing window 80 and by the list of points in the drawing order display section 82 of the editing window 80. Accordingly, by viewing the data content display section 81 and drawing order display section 82 in the editing window 80, the user can recognize the form in which the guide pattern will be drawn by the guide beam M prior to the actual drawing, thereby improving precision for adjusting the position of the workpiece W while referencing the guide pattern.

In the guide pattern editing process (S4) illustrated in FIG. 13, the laser machining apparatus 100 can edit the guide pattern generated in the guide pattern generation process (S3) when the user operates the input operation unit 76 to perform editing operations in the editing window 80 illustrated in FIG. 14. In this way, the laser machining apparatus 100 can edit the guide pattern to conform with the shape of the workpiece W, the viewpoint of the user, and various other conditions and can generate a guide pattern by which the user can easily and accurately adjust the position of the workpiece W.

The laser machining apparatus 100 also determines whether the thickness of the workpiece W identified from the workpiece shape information is greater than or equal to a prescribed thickness (S74) and performs a warning process (S75) to display a warning message on the LCD 77 specifying that visibility of the guide pattern may be poor owing to the thickness of the workpiece W when the thickness of the workpiece W exceeds the prescribed thickness. In this way, the laser machining apparatus 100 enables the user to recognize when there is high probability that the visibility of the guide pattern will be impacted by the thickness of the workpiece W, such as when a portion of the guide pattern drawn by the guide beam M will be blocked from the user's line of sight by the workpiece W, enabling the user to take suitable measures, such as deleting, adding, moving, or performing other editing on feature points P in the guide pattern.

In the embodiment described above, the laser machining apparatus 100 is an example of the laser machining apparatus of the present disclosure. The laser oscillation unit 12 is an example of the laser emission device of the present disclosure, and the laser beam L is an example of the laser beam of the present disclosure. The guide beam unit 17 is an example of the guide beam emission device of the present disclosure, and the guide beam M is an example of the guide beam of the present disclosure. The galvano scanner 19 is an example of the scanner of the present disclosure. The CPU 71 is an example of the processor of the present disclosure, and the RAM 72, ROM 73, and HDD 75 are examples of the memory of the present disclosure. The imaging unit 57 is an example of the imaging device of the present disclosure, and the LCD 77 is an example of the display of the present disclosure. The input operation unit 76 is an example of the operation interface of the present disclosure. The feature point P is an example of the feature point of the present disclosure, and the contour point O is an example of the contour point of the present disclosure. The velocity sequence V is an example of the first vector of the present disclosure, and the cumulative sequence C is an example of the second vector of the present disclosure. The hole guide mark Mh is an example of the hole guide mark of the present disclosure. The workpiece contour image Io is an example of the workpiece contour image of the present disclosure, the machining content image Im is an example of the machining pattern image of the present disclosure, and the guide pattern image Ig is the guide pattern image of the present disclosure.

While the description has been made in detail with reference to a specific embodiment, it would be apparent to those skilled in the art that various changes and modifications may be made thereto. For example, when the CPU 71 detects the hole Hw in the workpiece W in the hole detection process (S51), in S53 of the embodiment described above the CPU 71 is configured to modify the portion of the guide pattern indicating the position of the hole Hw to the hole guide mark Mh. However, the CPU 71 may be configured to perform the following process as well.

When the indication for the position of the hole Hw is modified to the cross-shaped hole guide mark Mh, as illustrated in FIG. 11, a plurality of feature points P (at least four corresponding to the ends of the vertical and horizontal lines constituting the hole guide mark Mh) is added for drawing the hole guide mark Mh. This likely extends the path of the guide beam M required for drawing a guide pattern that includes the hole guide mark Mh.

In this case, after modifying the indication for the hole Hw to the hole guide mark Mh and adding the plurality of feature points P, the CPU 71 performs the same determination described in S56 to determine whether the length of the drawing path for the guide pattern that includes the hole guide mark Mh is greater than or equal to the threshold value. If the length of the path is greater than or equal to the threshold value, the CPU 71 may be configured to delete feature points P from the guide pattern giving priority to those feature points P constituting the hole guide mark Mh.

While the hole guide mark Mh described in the embodiment is shaped in the form of a cross, as illustrated in FIG. 11, the shape of the hole guide mark Mh is not limited to a cross shape. For example, the hole guide mark Mh may be shaped in the form of the letter L or the letter V, both of Which are formed by two line segments joined together. When the hole guide mark Mh is formed in a L-shape or a V-shape, the lengths of the line segments that are drawn for the hole guide mark Mh can be made shorter than the line segments used to form the cross shape.

In the embodiment described above, the guide pattern image Ig displayed in the data content display section 81 is determined on the basis of the workpiece shape information, but the guide pattern image Ig may be set on the basis of both the workpiece shape information and the machining content described by the machining data.

In S59 of the embodiment described above, the CPU 71 resets the drawing order of the feature points P in order to connect the feature points P before and after the feature point P deleted in S58, but the present disclosure is not limited to this configuration. For example, the CPU 71 may simply set the drawing order for the feature points P in the guide pattern by executing the same process described in S54 on all feature points P constituting the guide pattern after the feature point P was deleted.

In the embodiment described above, the CPU 71 of the PC 7 executes the program for the workpiece setup assistance process, but another processor such as the CPU 61 of the laser controller 5 may execute the program for the workpiece setup assistance process instead. In this case, the laser controller 5 is preferably provided with an image display unit such as a liquid crystal display for displaying the editing window 80 and the like.

What is claimed is:

1. A laser machining apparatus comprising:
   a laser beam emission device configured to emit a laser beam for machining a workpiece;
   a guide beam emission device configured to emit a visible laser beam as a guide beam;
   a scanner configured to scan the laser beam emitted from the laser beam emission device and the guide beam emitted from the guide beam emission device;
   a processor; and
   a memory storing a set of computer-readable instructions therein, the set of computer-readable instructions, when executed by the processor, causing the laser machining apparatus to perform:
      acquiring workpiece contour information specifying a contour of the workpiece;
      extracting a plurality of feature points from the workpiece contour information, each of the plurality of feature points being on the contour of the workpiece;
      generating a guide pattern prior to placing the workpiece at a setup position indicating the setup position of the workpiece according to the plurality of feature points; and drawing the guide pattern with the guide beam by controlling the guide beam emission device and the scanner; and machining the workpiece with the laser beam by controlling the laser beam emission device and the scanner, wherein the workpiece is placed at the setup position indicated by the guide pattern while the guide pattern is being drawn, and the machining is performed after the workpiece is placed at the setup position.

2. The laser machining apparatus according to claim 1, wherein the workpiece contour information specifies a plurality of contour points forming the contour of the workpiece by connecting the plurality of contour points consecutively, and wherein the extracting determines a part of the plurality of contour points as the plurality of feature points.

3. The laser machining apparatus according to claim 2, wherein the extracting includes:

generating a set of vectors from a part of consecutively arranged contour points forming a part of the contour of the workpiece, the set of vectors including a first vector and a second vector different from the first vector, the first vector being defined by connecting two contour points, the second vector being defined by connecting two contour points with one or more intervening contour points therebetween, wherein at least one common contour point is included in making up of both the first vector and the second vector; and determining one of the at least one common contour point as a feature point when a change amount of the first vector and the second vector exceeds a prescribed value.

4. The laser machining apparatus according to claim 3, wherein the first vector is defined by connecting two contour points with one or more intervening contour points therebetween, the one or more intervening contour points including the feature point.

5. The laser machining apparatus according to claim 1, wherein the set of computer-readable instructions, when executed by the processor, causes the laser machining apparatus to further perform receiving workpiece shape information specifying an external three-dimensional shape of the workpiece, and wherein the acquiring acquires the workpiece contour information on the basis of the workpiece three-dimensional shape information.

6. The laser machining apparatus according to claim 5, further comprising an imaging device configured to capture an image of the workpiece to output imaging data representing the image of the workpiece, wherein the receiving receives the imaging data as the workpiece three-dimensional shape information, and wherein the acquiring acquires the workpiece contour information on the basis of the imaging data.

7. The laser machining apparatus according to claim 1, wherein the generating generates the guide pattern formed by consecutively connecting the plurality of feature points.

8. The laser machining apparatus according to claim 7, wherein the generating includes determining whether a length of a path of feature point connecting line is greater than or equal to a prescribed length, and wherein the generating generates the guide pattern formed by consecutively connecting a part of the plurality of feature points in response to determining that the length of the path is greater than or equal to the prescribed length.

9. The laser machining apparatus according to claim 7, wherein the generating includes setting a drawing order for the plurality of feature points in the guide pattern so as to minimize a length of a path that passes once through each of the plurality of feature points.

10. The laser machining apparatus according to claim 1, wherein the set of computer-readable instructions, when executed by the processor, causes the laser machining apparatus to further perform detecting a hole formed in the workpiece, and wherein the generating generates the guide pattern in which a mark specifying a position corresponding to the hole is changed to a hole guide mark, the hole guide mark at least partially extending onto a surface of the workpiece.

11. The laser machining apparatus according to claim 1, further comprising a display configured to display a screen, and wherein the set of computer-readable instructions, when executed by the processor, causes the laser machining apparatus to further perform displaying a workpiece contour image based on the workpiece contour information, a machining pattern image based on machining data, and a guide pattern image based on the guide pattern in the screen displayed on the display, the workpiece contour image, the machining content image, and the guide pattern image being superimposed on each other.

12. The laser machining apparatus according to claim 11, wherein the set of computer-readable instructions, when executed by the processor, causes the laser machining apparatus to further perform displaying a drawing order for the plurality of feature points in the guide pattern along with the guide pattern image in the screen displayed on the display.

13. The laser machining apparatus according to claim 1, further comprising an operation interface, and wherein the set of computer-readable instructions, when executed by the processor, causes the laser machining apparatus to further perform:

receiving a user operation instructing to edit the guide pattern via the operation interface; and editing the guide pattern according to the user operation.

14. The laser machining apparatus according to claim 1, wherein the set of computer-readable instructions, when executed by the processor, causes the laser machining apparatus to further perform:

receiving workpiece thickness information specifying a thickness of the workpiece;

determining whether the thickness of the workpiece is greater than or equal to a prescribed thickness; and in response to determining that the thickness of the workpiece is greater than or equal to the prescribed thickness, warning a user of degradation of visibility due to the thickness of the workpiece.

* * * * *